(12) United States Patent
Diez et al.

(10) Patent No.: US 9,109,351 B2
(45) Date of Patent: Aug. 18, 2015

(54) CONNECTOR ASSEMBLY FOR A DRAINAGE CONDUIT

(75) Inventors: Carl Diez, Sabrevois (CA); Robert Lafontaine, Boucherville (CA)

(73) Assignee: SOLENO INC., St-Jean-sur-le-Richelieu, Quebec (CA)

( * ) Notice: Subject to any disclaimer, the term of this patent is extended or adjusted under 35 U.S.C. 154(b) by 692 days.

(21) Appl. No.: 11/434,825

(22) Filed: May 16, 2006

(65) Prior Publication Data

US 2007/0001456 A1  Jan. 4, 2007

Related U.S. Application Data

(60) Provisional application No. 60/681,020, filed on May 16, 2005, provisional application No. 60/686,463, filed on Jun. 2, 2005.

(51) Int. Cl.
*F16L 17/00* (2006.01)
*E03F 3/04* (2006.01)
*F16L 25/00* (2006.01)

(52) U.S. Cl.
CPC ............... *E03F 3/04* (2013.01); *F16L 25/0036* (2013.01); *F16L 25/0063* (2013.01)

(58) Field of Classification Search
USPC ............... 285/417, 403, 404, 903, 45, 47, 55, 285/369, 915, 374
See application file for complete search history.

(56) References Cited

U.S. PATENT DOCUMENTS

| | | | | |
|---|---|---|---|---|
| 931,581 A * | 8/1909 | Doyle | ............................ | 285/114 |
| 3,514,132 A * | 5/1970 | Peabody | ........................ | 285/331 |
| 3,796,057 A * | 3/1974 | Dougherty | .................... | 405/251 |
| 3,941,410 A * | 3/1976 | Miyaoka | ........................ | 285/321 |
| 4,542,922 A * | 9/1985 | Grossauer | ...................... | 285/320 |
| 4,575,132 A * | 3/1986 | Nattel | ............................. | 285/194 |
| 4,602,807 A * | 7/1986 | Bowers | ........................... | 285/45 |
| 4,657,286 A * | 4/1987 | Guest | ............................. | 285/323 |
| 4,757,160 A * | 7/1988 | Lorenz et al. | ................ | 174/94 S |
| 4,865,356 A * | 9/1989 | Moore et al. | .................... | 285/55 |
| 5,257,836 A * | 11/1993 | Smith | ............................. | 285/374 |
| 5,351,999 A * | 10/1994 | Hattori | ........................... | 285/404 |
| 5,362,113 A * | 11/1994 | Thomas | ...................... | 285/288.4 |
| 5,887,909 A * | 3/1999 | Tokuda | ...................... | 285/148.9 |
| 5,901,987 A * | 5/1999 | Godeau | ..................... | 285/148.19 |
| 6,199,918 B1 * | 3/2001 | Gerich | ........................... | 285/308 |
| 6,199,920 B1 * | 3/2001 | Neustadtl | ...................... | 285/322 |
| 6,767,280 B1 * | 7/2004 | Berger | ........................... | 454/339 |
| 7,434,850 B2 * | 10/2008 | Duininck et al. | ............. | 285/374 |
| 2003/0047946 A1 * | 3/2003 | Ohanesian | .................... | 285/404 |

(Continued)

FOREIGN PATENT DOCUMENTS

| | | | | |
|---|---|---|---|---|
| EP | 381981 A1 * | 8/1990 | ............. | F16L 25/00 |
| JP | 06229492 A * | 8/1994 | ............. | F16L 33/00 |

*Primary Examiner* — Aaron Dunwoody
(74) *Attorney, Agent, or Firm* — BCF LLP

(57) ABSTRACT

A connector for connecting lengths of conduit sections having an outer corrugated surface, comprising a body having apertures, an outer rigid surface and an inner deformable surface as well as opposite open extremities. The inner surface defines a channel for receiving at least one conduit section through at least one of the open extremities. Fasteners are inserted into the channel through said apertures. When the corrugated conduit is fitted into the channel, the fasteners are insertable through the apertures for extending into the channel thereby interfering with the corrugated surface of the conduit and substantially preventing the conduit from being removed from the channel.

13 Claims, 26 Drawing Sheets

(56) References Cited

U.S. PATENT DOCUMENTS

| | | |
|---|---|---|
| 2003/0127856 A1* | 7/2003 | Youssefifar .................. 285/319 |
| 2003/0146622 A1* | 8/2003 | Youssefifar .................. 285/305 |
| 2005/0161947 A1 | 7/2005 | Skinner |
| 2005/0275169 A1 | 12/2005 | Kish |
| 2007/0257488 A1* | 11/2007 | Jimenez ........................ 285/404 |

\* cited by examiner

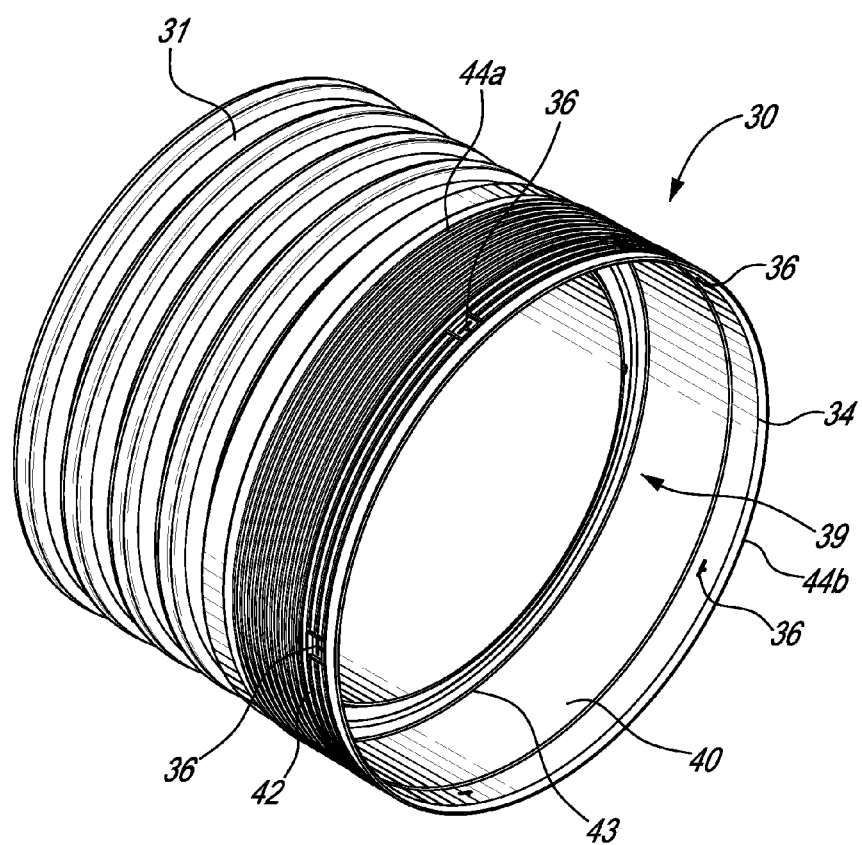

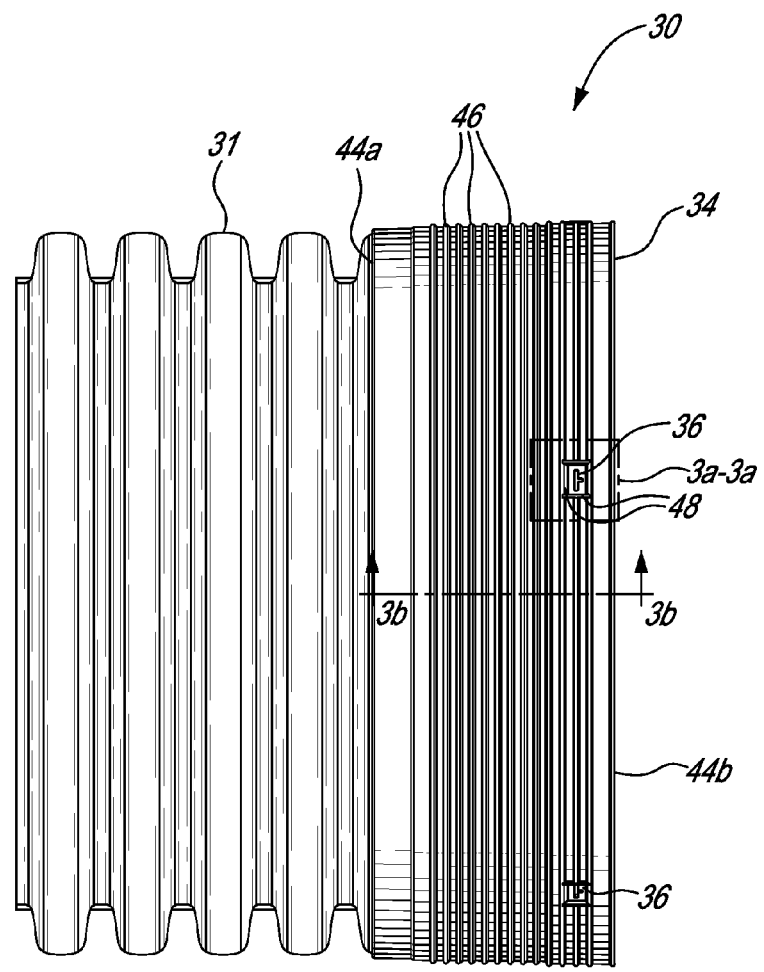

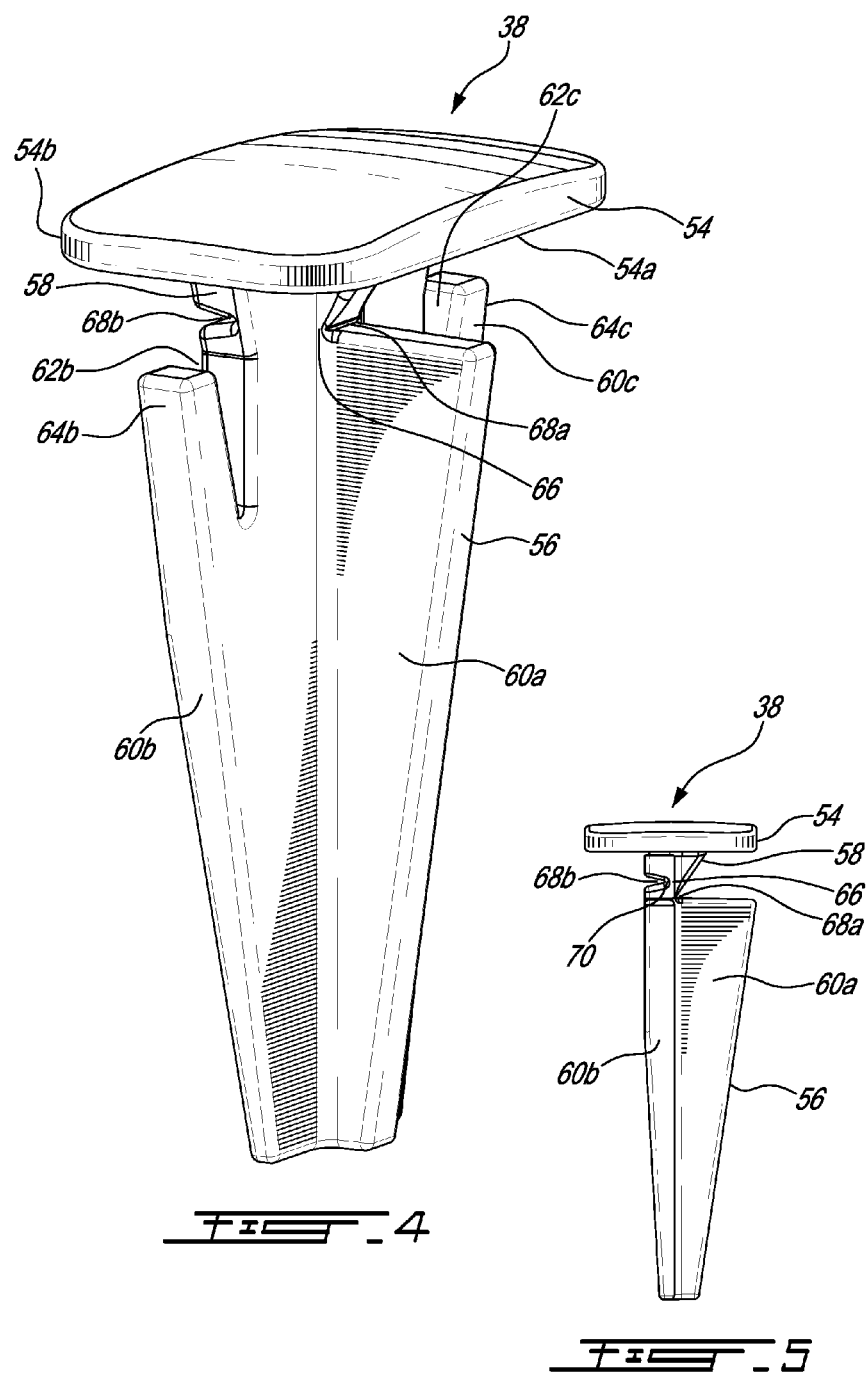

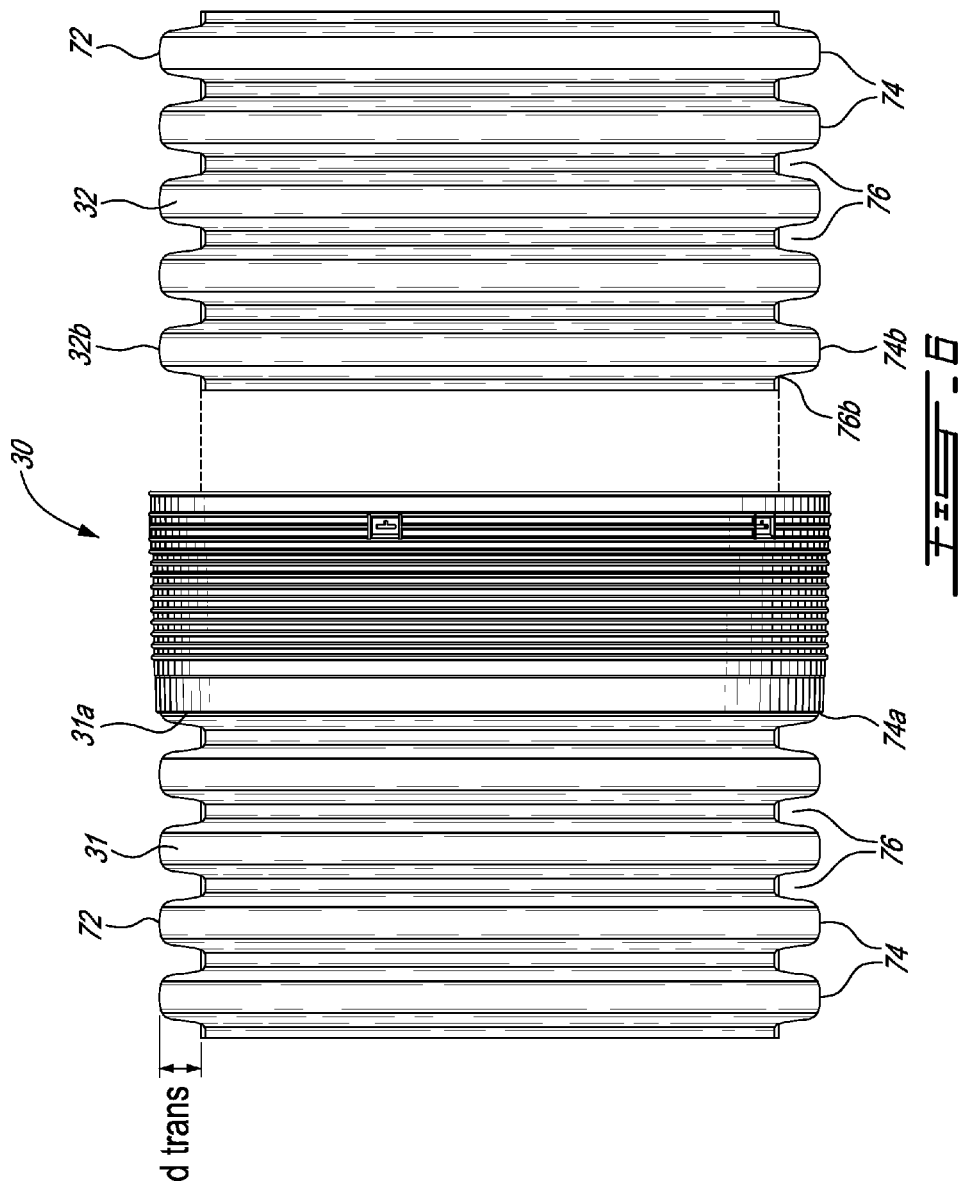

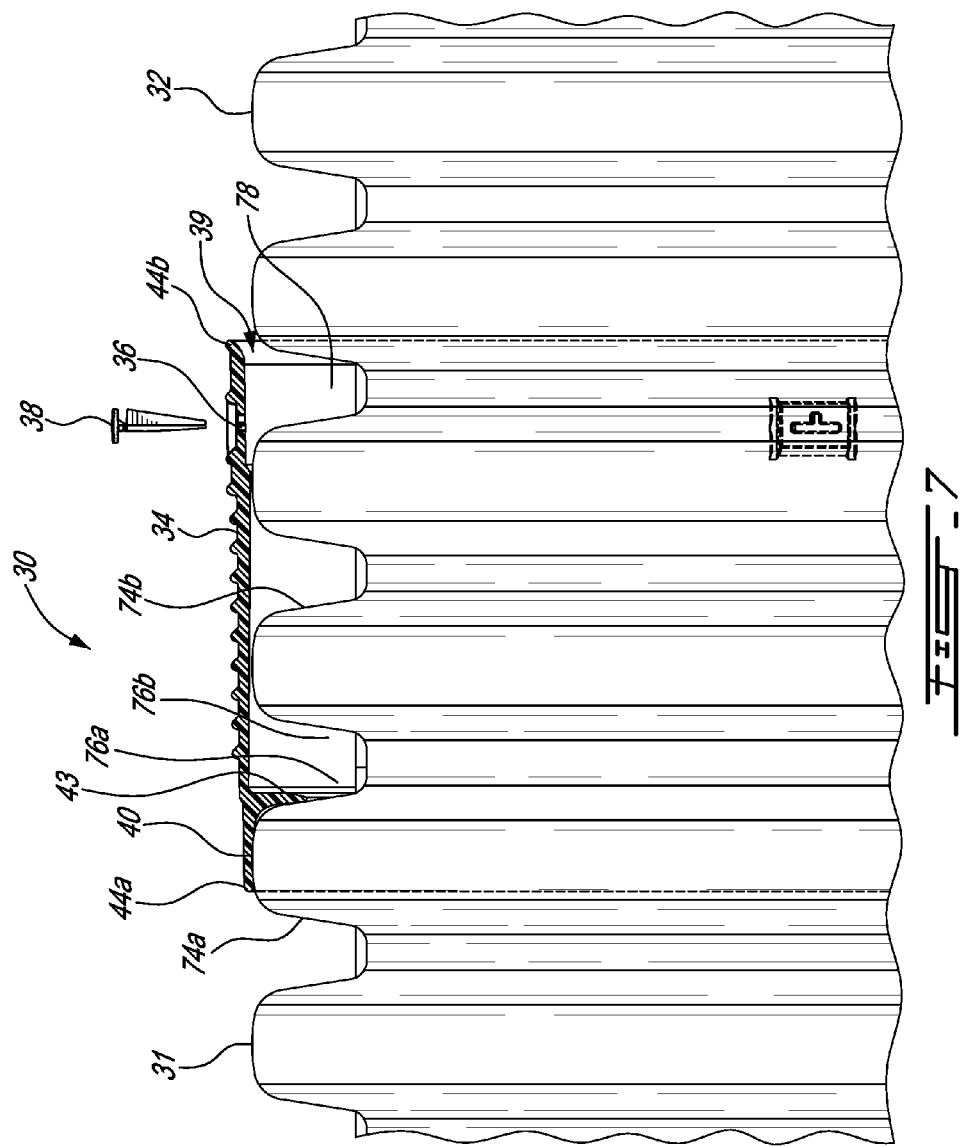

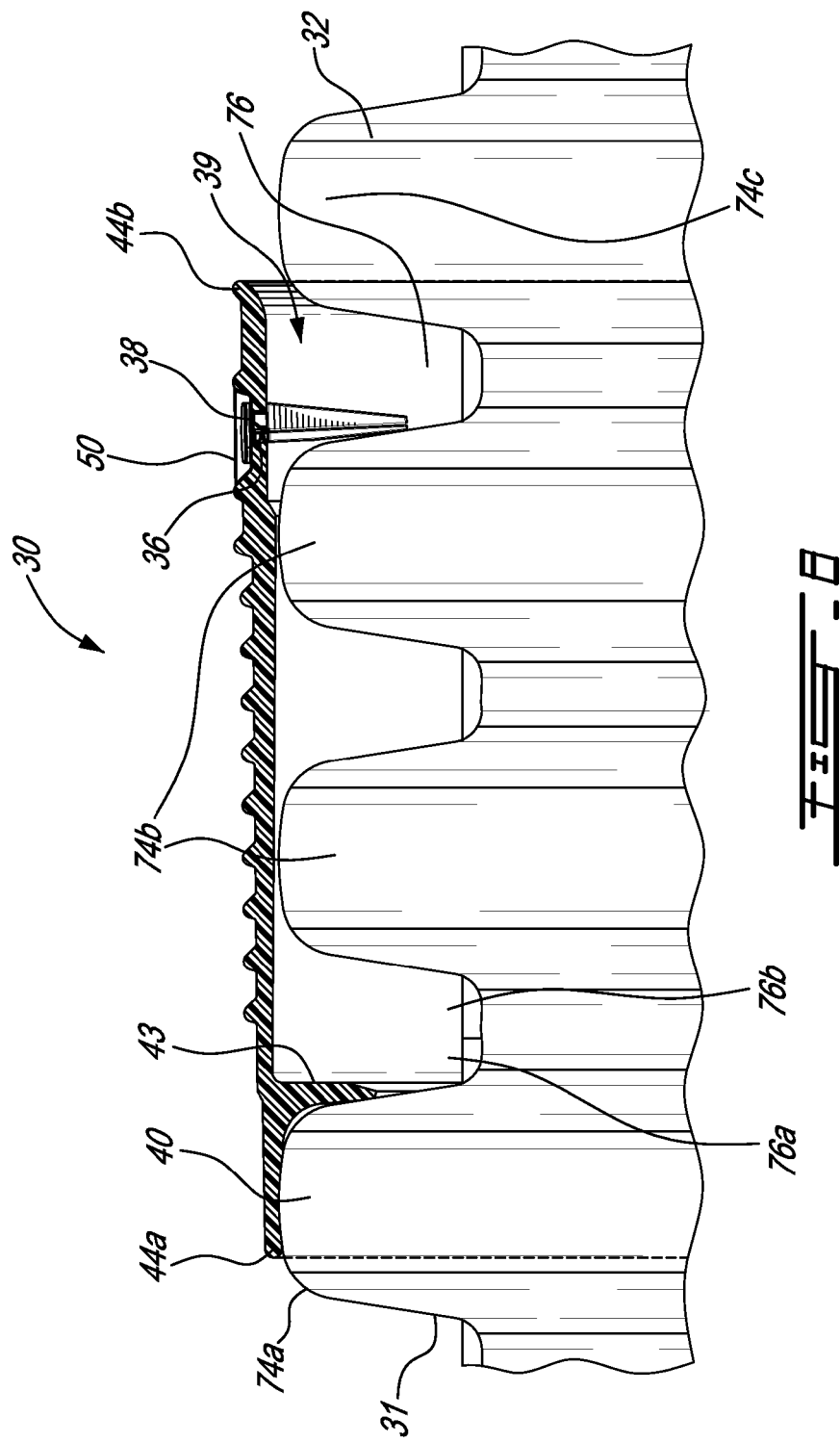

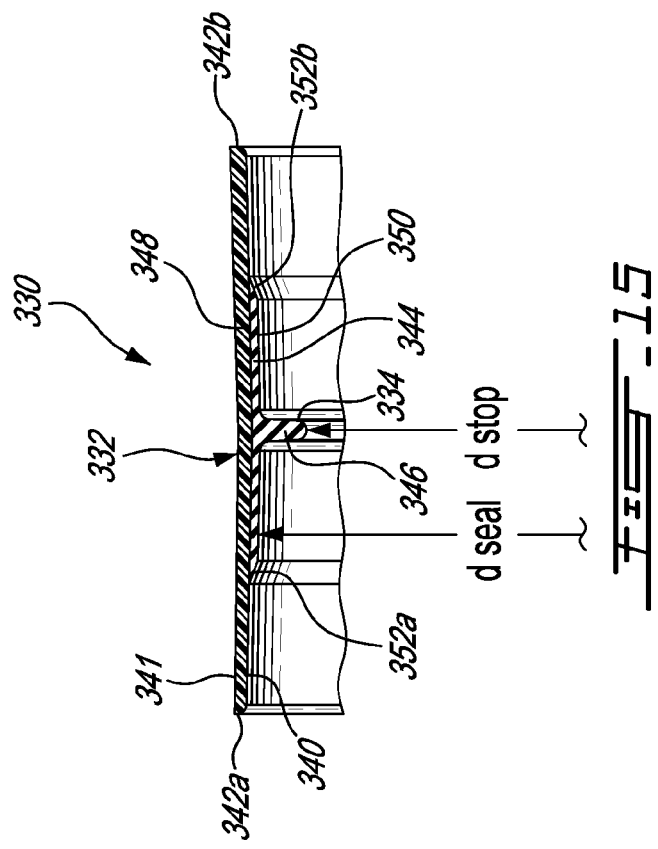
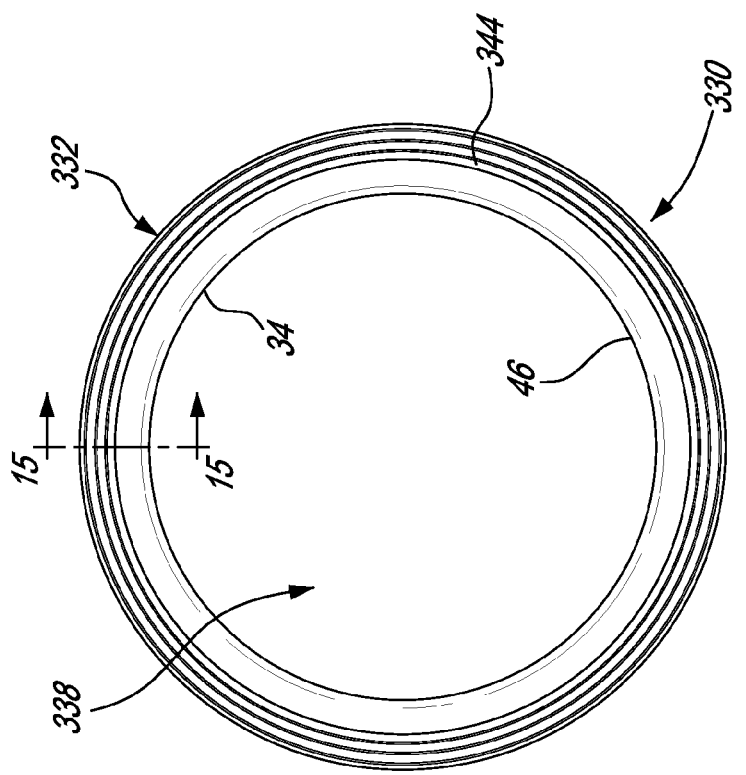

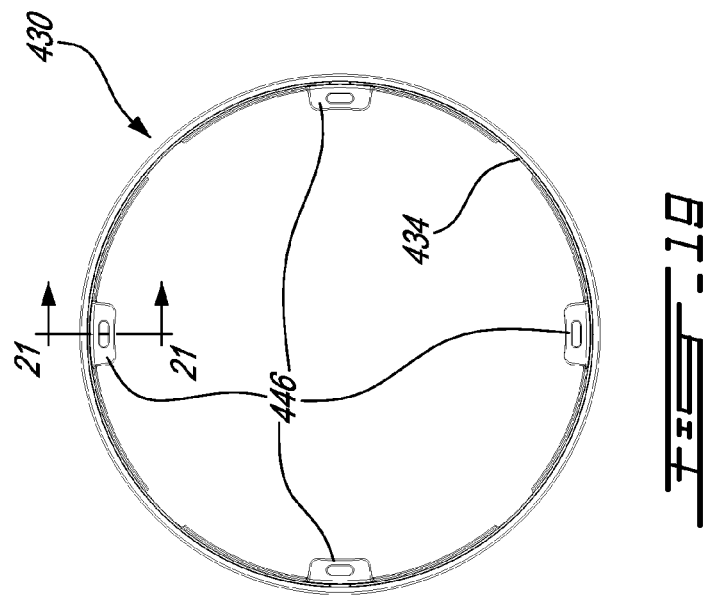
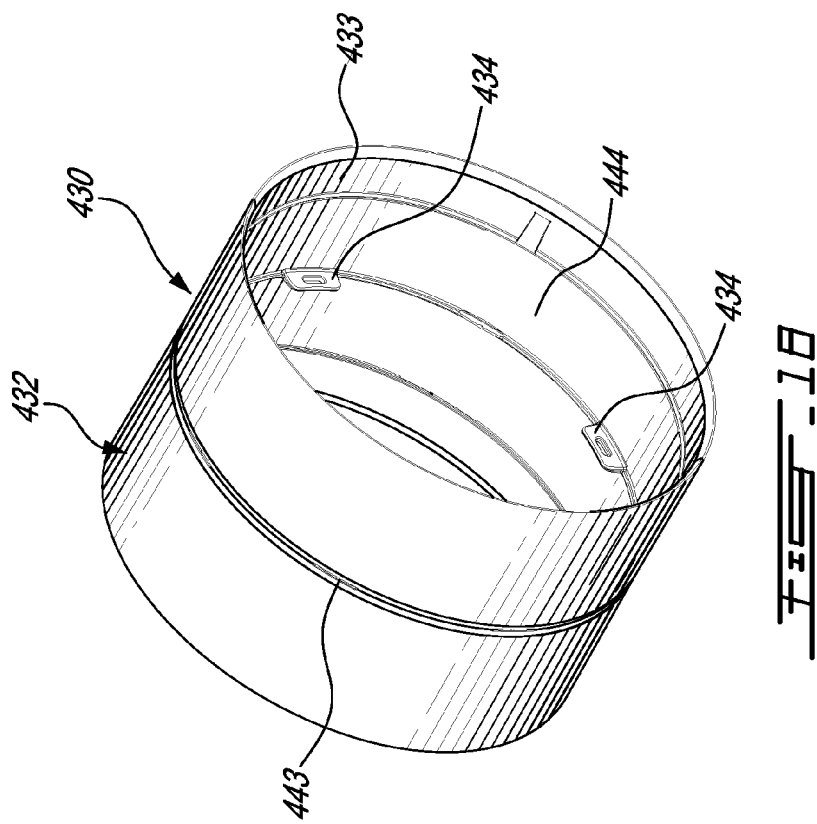

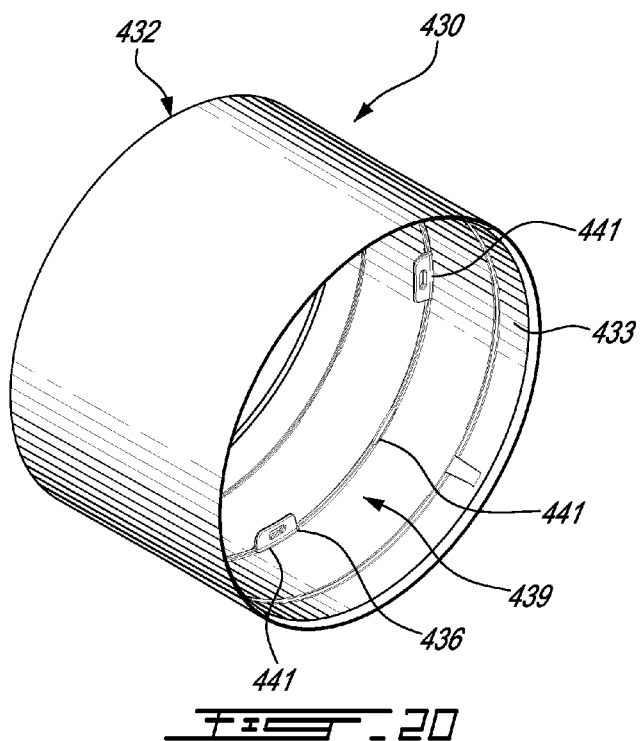
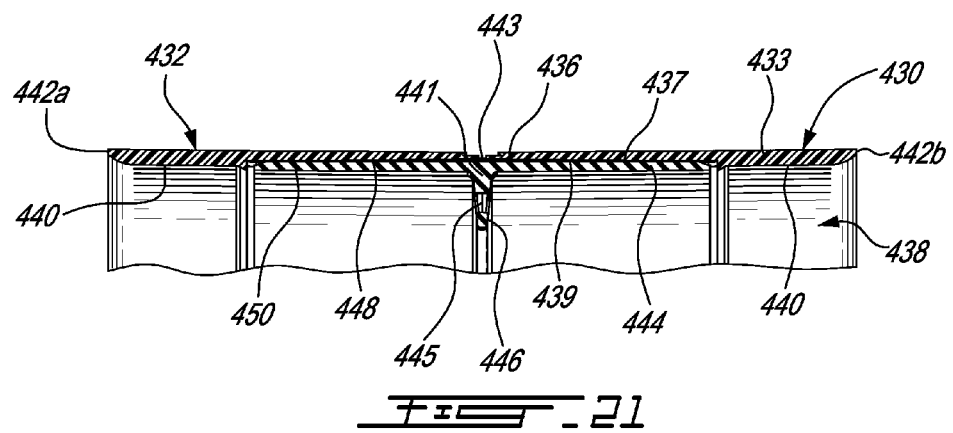

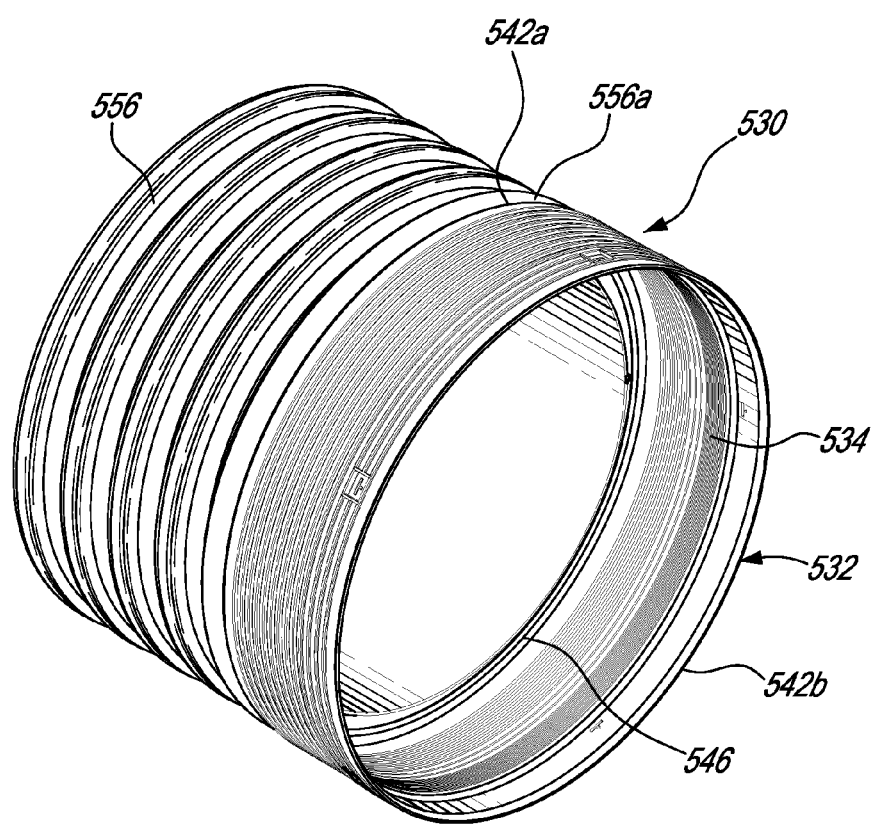

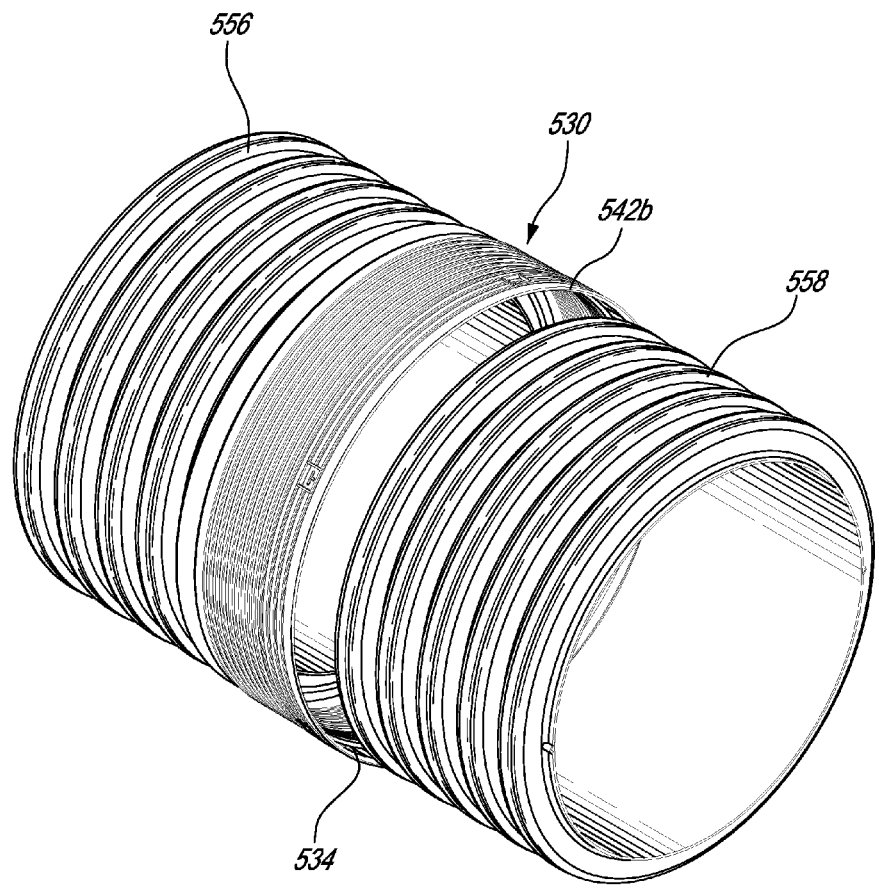

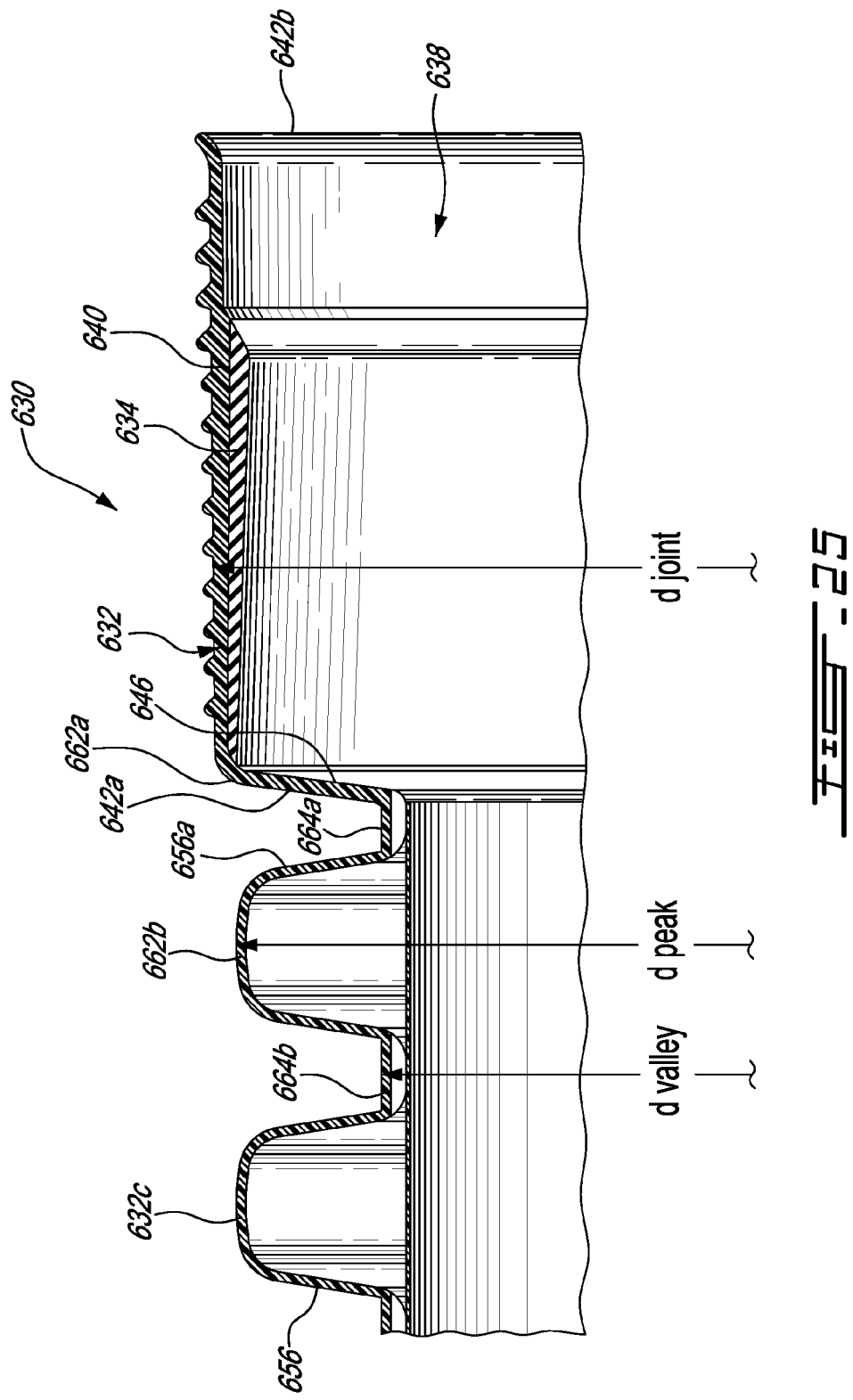

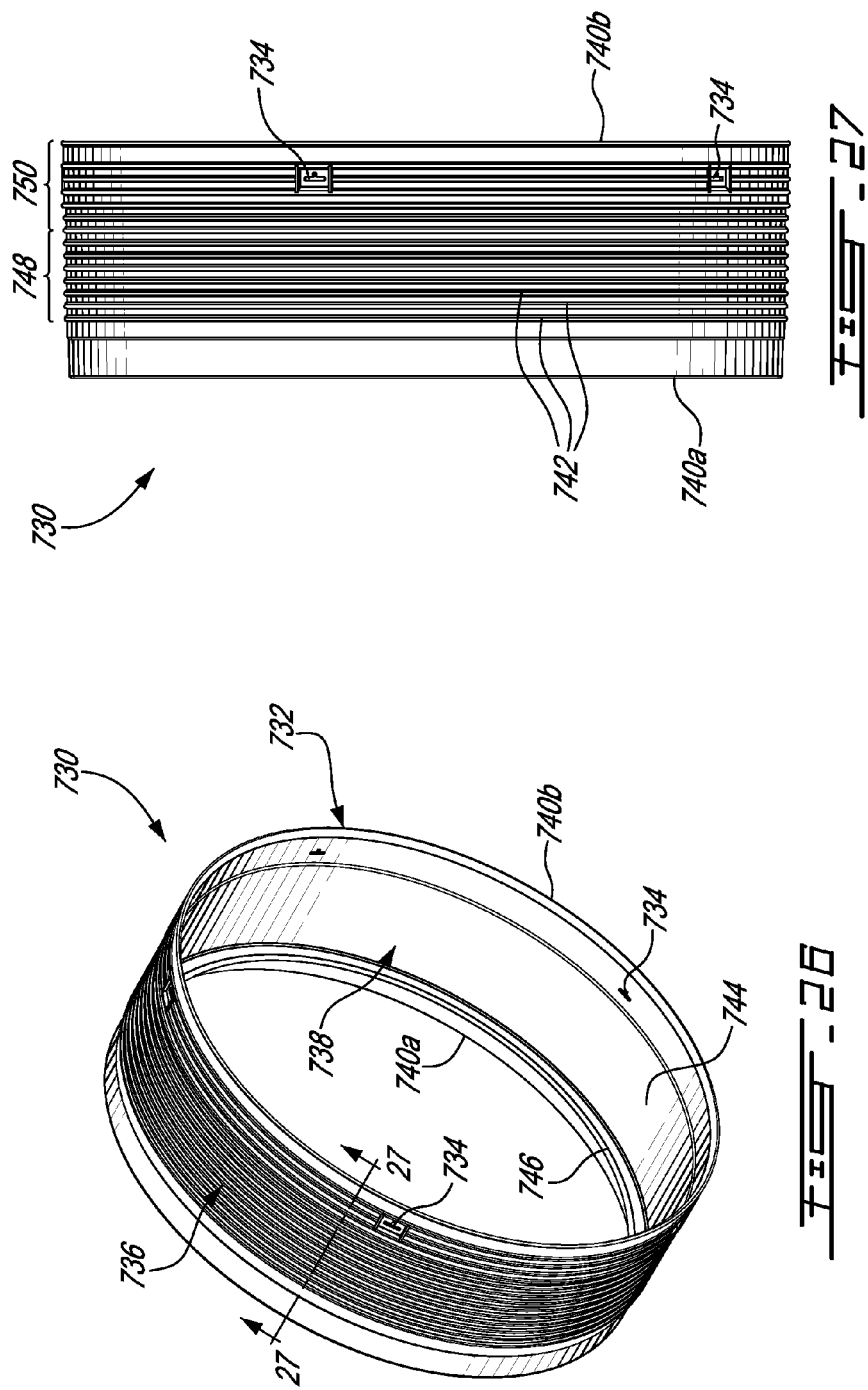

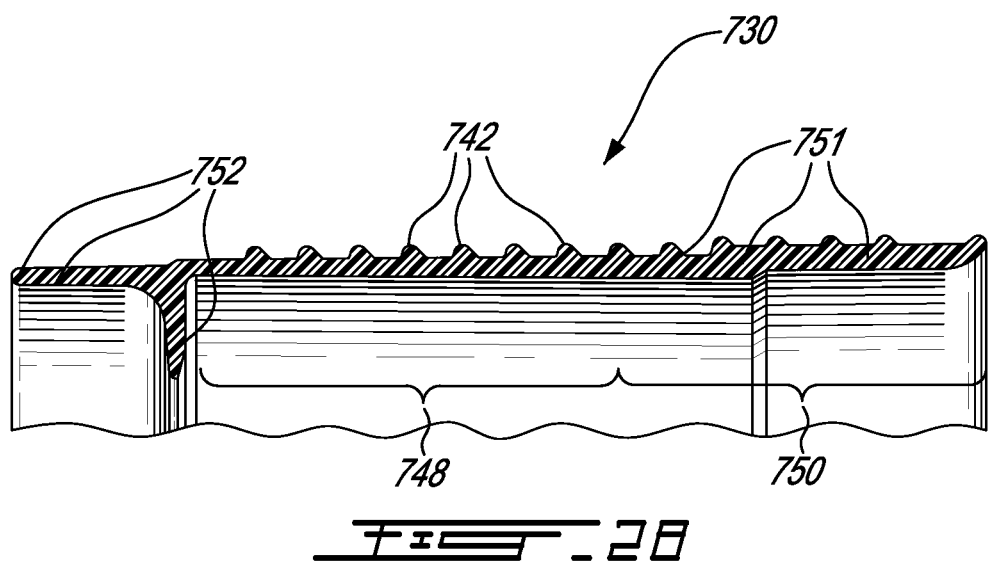

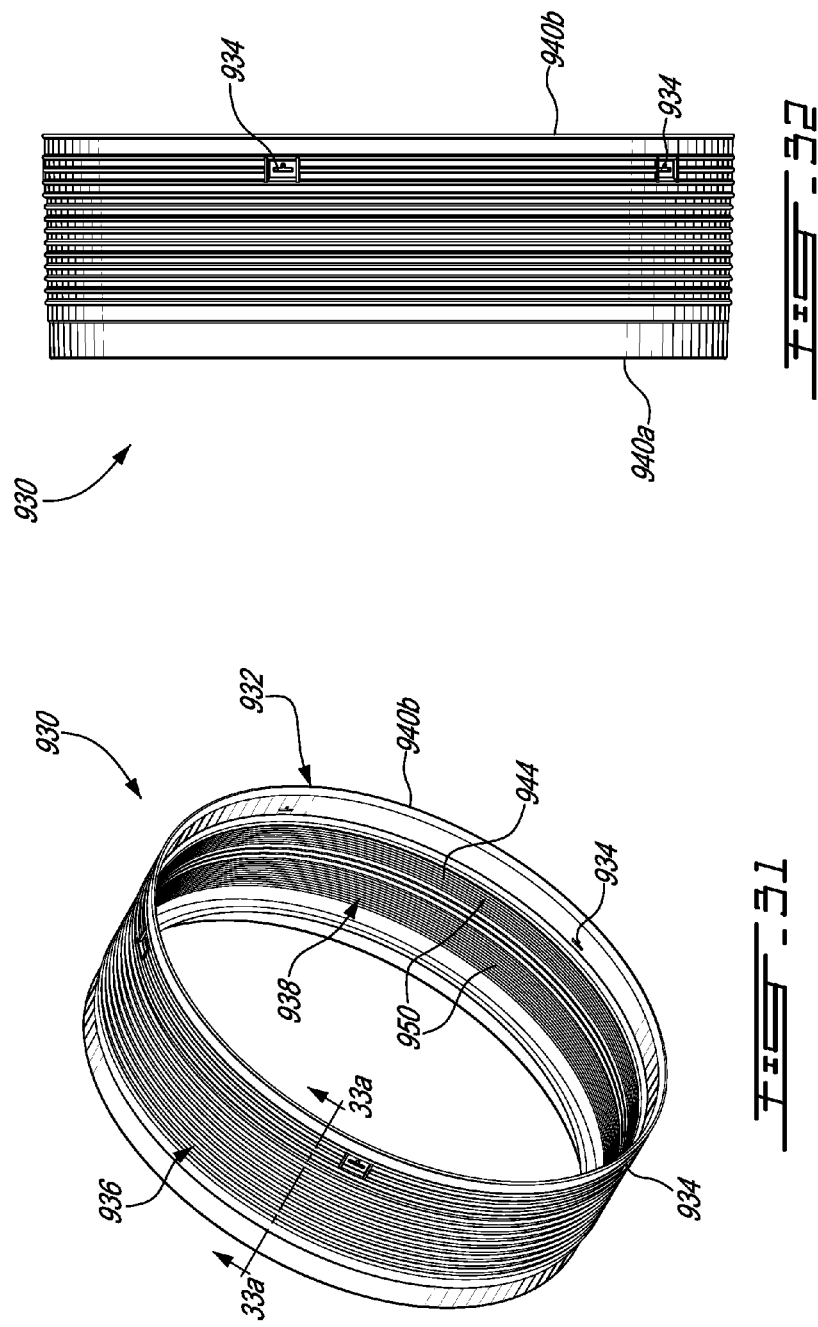

CONNECTOR ASSEMBLY FOR A DRAINAGE CONDUIT

CROSS-REFERENCE TO RELATED APPLICATIONS

This application claims the benefit of U.S. Provisional Application No. 60/681,020 filed on May 16, 2005, and of U.S. Provisional Application No. 60/686,463 filed on Jun. 2, 2005, both of which are hereby incorporated by reference in their entirety.

FIELD OF THE INVENTION

The present invention relates generally to connectors. More specifically but not exclusively, the present invention is concerned with a connector to interconnect drainage conduit sections.

BACKGROUND OF THE INVENTION

Drainage conduits made of plastic material are commonly used for underground applications such as domestic, agricultural, forestry and industrial drainage, and waste disposal systems. Generally, drainage conduits have corrugations that provide transversal reinforcement to minimize the possibility of collapse when they are buried. These corrugations, which may and may be defined by individually spaced apart rings or by one helicoidal extending corrugation, may further flexibility to the conduits, allowing them to be bent lengthwise.

Conventional drainage conduits are often found in sections having a length as long as 20 or 40 feet. When installed in the field, these sections generally need to be assembled end to end to define a drainage path that is longer than the available length of drainage conduit sections.

The assembly of consecutive drainage conduit sections may be both tedious and time consuming, since it is generally performed on site (i.e., in a trench in the ground), and often requires the manipulation of large diameters and lengthy conduit sections having various flexibilities. Additionally, drainage conduits often carry liquid or semi-liquid matter which generally needs to be kept inside.

Accordingly, there is a need for a connector assembly that allows the assembly of two consecutive sections of drainage conduits end to end in such a way as to minimize separation occurrences and that facilitates eventual disassembly. The present invention seeks to meet this and related needs.

SUMMARY OF THE INVENTION

An object of the invention is to provide an improved connector assembly for drainage conduit.

In accordance with an aspect of the present invention, there is provided a connector for connecting lengths of conduit sections having an outer corrugated surface, said connector comprising: a body comprising apertures, outer and inner surfaces, and opposite open extremities, said inner surface defining a channel for receiving at least one conduit section through at least one of said open extremities; fasteners for being inserted into said channel through said apertures;
    wherein when the corrugated conduit is fitted into said channel, said fasteners being insertable through said apertures for extending into said channel thereby interfering with the corrugated surface of the conduit substantially preventing the conduit from being removed from said channel.

In an embodiment, the corrugated surface defines successive and alternating annular peaks and valleys, each said fastener extending into a given valley thereby interfering with the peaks adjacent to the given valley.

In an embodiment, said fastener comprises a bottom portion for extending into said channel through said aperture and a top portion that is so configured and sized as to be prevented from being inserted into said aperture. In an embodiment, said outer surface comprises a cavity about a said aperture for receiving said fastener top portion therein. In an embodiment, said fastener comprises a neck portion between said top and bottom portions. In an embodiment, said neck portion comprising breakable portion for being broken under a force, thereby disengaging said fastener from said connector. In an embodiment, said neck comprises reinforcement portions. In an embodiment, said neck comprises grooves for being engaged by a mouth defined by said aperture.

In an embodiment, said fastener comprises a bottom portion having a resilient deformable portion, said deformable portion being deformed during insertion into said aperture and regaining a non deformed configuration when fully inserted into said channel thereby substantially preventing said fastener from being removed from said aperture. In an embodiment, said deformable portion comprises at least one protrusion. In an embodiment, said deformable portion in non deformed configuration is greater in size than said aperture. In an embodiment, said bottom portion comprises an elongate tapered configuration.

In an embodiment, said fastener comprises a an elongate bottom portion defining wing elements, said aperture comprising slits, said wing elements corresponding to said slits.

In an embodiment, said inner surface comprises a stopper protruding into said channel for stopping a conduit section at a predetermined position within said channel. In an embodiment, said stopper comprises an annular protrusion. In an embodiment, said annular protrusion is positioned nearer to one of said open extremities. In an embodiment, said annular protrusion provides for a conduit section to be connected thereto. In an embodiment, said annular protrusion provides for a conduit section to be welded thereto. In an embodiment, said annular protrusion is about the middle of the distance between said open extremities. In an embodiment, said stopper comprises a plurality of separate and annularly aligned protruding members.

In an embodiment, said inner surface comprises a seal member. In an embodiment, said seal member provides for a sealing fit with the conduit section. In an embodiment, said seal member comprises a gasket. In an embodiment, said seal member comprises a sealing surface and opposite tapered ends. In an embodiment, said seal member comprises a contact surface for sealing contact with the conduit section, said contact surface comprising rib elements. In an embodiment, said seal member comprises a stopper protruding into said channel for stopping a conduit section at a predetermined position within said channel. In an embodiment, said stopper comprises an annular protrusion. In an embodiment, said annular protrusion is about the middle of the distance between said open extremities. In an embodiment, said stopper comprises a plurality of separate and annularly aligned protruding member.

In an embodiment, said outer surface comprises reinforcing elements. In an embodiment, said reinforcing elements comprise ribs. In an embodiment, said body comprises a flexion portion thereof which provides said body with flexibility. In an embodiment, said body comprises a reinforcing portion thereof. In an embodiment, said reinforcing portion comprises areas that are thicker than the rest of said body. In an embodiment, wherein said body comprises a welding portion thereof for being welded to a conduit section.

In an embodiment, said body comprises two separate members being joined together at a junction thereof.

In accordance with another aspect of the present invention, there is provided a connector for connecting lengths of conduit sections, said connector comprising: a body comprising outer and inner surfaces and opposite open extremities, said inner surface defining a channel for receiving at least one conduit section through at least one of said open extremities; a seal member mounted to said inner surface and comprising a contact surface; wherein when the conduit is fitted into said channel, said seal member contact surface engages the conduit in a sealing fit therewith.

In an embodiment, said seal member comprises a gasket. In an embodiment, said seal member comprises opposite tapered ends. In an embodiment, said contact surface comprises rib elements in an embodiment, said seal member comprises a stopper protruding into said channel for stopping a conduit section at a predetermined position within said channel. In an embodiment, said stopper comprises an annular protrusion. In an embodiment, said annular protrusion is positioned about the middle of the distance between said open extremities. In an embodiment, said stopper comprises a plurality of separate and annularly aligned protruding member.

In an accordance with a further aspect of the present invention, there is provided a connector for connecting lengths of conduit sections, said connector comprising a body comprising two separate body members joined at a junction thereof, said body comprising outer and inner surfaces and opposite open extremities, and said inner surface defining a channel for receiving at least one conduit section through at least one of said open extremities.

In an embodiment, the present invention relates to connectors and more specifically to a connector for drainage conduits that are typically used for carrying liquid or semi-solid matters from one location to another. The connector includes a body provided with a passage, apertures and clips, the clips being so configured and sized as to and removable from the connector such that the drainage conduits may be securely assembled to and disassembled from the connector. In an embodiment, the connector of the present invention further comprises a gasket for sealingly engaging drainage conduit sections.

The terminology used herein is for the purpose of describing particular embodiments only and is not intended to limit the scope of the present invention. Unless defined otherwise or the context clearly dictates otherwise, all technical and scientific terms used herein have the same meaning as commonly understood by one of ordinary skill in the art to which this invention belongs.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

The term connector as used herein also comprises the terms "sealing joint" as well as a "coupler".

Terms such as "mounted", "connected," "attached," and "linked" may be used interchangeably herein and encompass direct as well as indirect connection, attachment, linkage or conjugation unless the context clearly dictates otherwise.

Where a value is explicitly recited, it is to be understood that values which are about the same quantity or amount as the recited value are also within the scope of the invention, as are ranges based thereon.

The term "plastic" covers a range of synthetic or semi synthetic polymerization products. They are composed of organic condensation or addition polymers and may contain other substances to improve performance or economics. There are few natural polymers generally considered to be "plastics". Plastics are designed with immense variation in properties such as heat tolerance, hardness and resiliency.

The term "metal" designates any of several chemical elements that are usually shiny solids that conduct heat or electricity and can be formed into sheets etc.

The term "alloy" is meant to signify a combination in a compound of two or more elements, at least one of which is a metal, and where the resulting material has metallic properties. The resulting metallic substance generally has properties significantly different from those of its components. For example, steel is stronger than iron, one of its main elements.

The term "rubber" refers to an elastic material obtained from the latex sap of trees (especially trees of the genera *Hevea* and *Ficus*) that can be vulcanized and finished into a variety of products, and is meant to include any of various synthetic elastic materials whose properties resemble natural rubber.

The foregoing and other objects, advantages and features of the present invention will become more apparent upon reading of the following non-restrictive description of illustrative embodiments thereof, given by way of example only with reference to the accompanying drawings.

BRIEF DESCRIPTION OF THE DRAWINGS

In the appended drawings:

FIG. 1 is a perspective view of a connector according to an illustrative embodiment of the present invention, shown mounted to an end of a conduit section;

FIG. 2 is a side elevation view of the connector of FIG. 1;

FIG. 4 is a perspective view showing a clip used with the connector of FIG. 1;

FIG. 5 is a side elevation view showing the clip of FIG. 4;

FIG. 6 is a side elevation view showing two drainage conduits about to be interconnected via the connector of FIG. 1;

FIG. 7 is a partially sectioned side elevation view showing two drainage conduits interconnected via the connector of FIG. 1;

FIG. 8 is a partially sectioned side elevation view showing the assembly of the clip to the connector;

FIG. 10a is an enlarged view of the portion 10a of FIG. 10 showing one end portion of the connector; FIG. 10b is an enlarged view of the portion 10a of FIG. 10 showing another end portion of the connector opposite the end portion of FIG. 10a;

FIG. 14 is a front elevation view of the connector of FIG. 13;

FIG. 15 is a section view taken along line 15-15 of FIG. 14;

FIG. 18 is a perspective view of a connector according to a fifth illustrative embodiment of the present invention;

FIG. 19 is a front elevation view of the connector of FIG. 18;

FIG. 20 is a partial perspective view of the connector of FIG. 18;

FIG. 21 is a section view taken along line 21-21 of FIG. 19;

FIG. 23 is a perspective view showing a drainage conduit assembled to the connector of FIG. 22;

FIG. 24 is a perspective view showing another drainage conduit being assembled to the connector of FIG. 22;

FIG. 25 is a side section view of a connector according to a seventh illustrative embodiment of the present invention;

FIG. 26 is a perspective view of a connector according to an eighth illustrated embodiment of the present invention;

FIG. 27 is a front elevational view of the connector of FIG. 26;

FIG. 28 is a sectional front view of FIG. 26 taken along line 27-27;

FIG. 31 is a perspective view of a connector in accordance with a tenth illustrative embodiment of the present invention;

FIG. 32 is a front elevational view of the connector of FIG. 31;

FIG. 33a is a font sectional view of FIG. 31 taken along line 33a-33a;

FIG. 33b is an enlarged view of portion 33b of FIG. 33a;

DETAILED DESCRIPTION

Figure 3A:
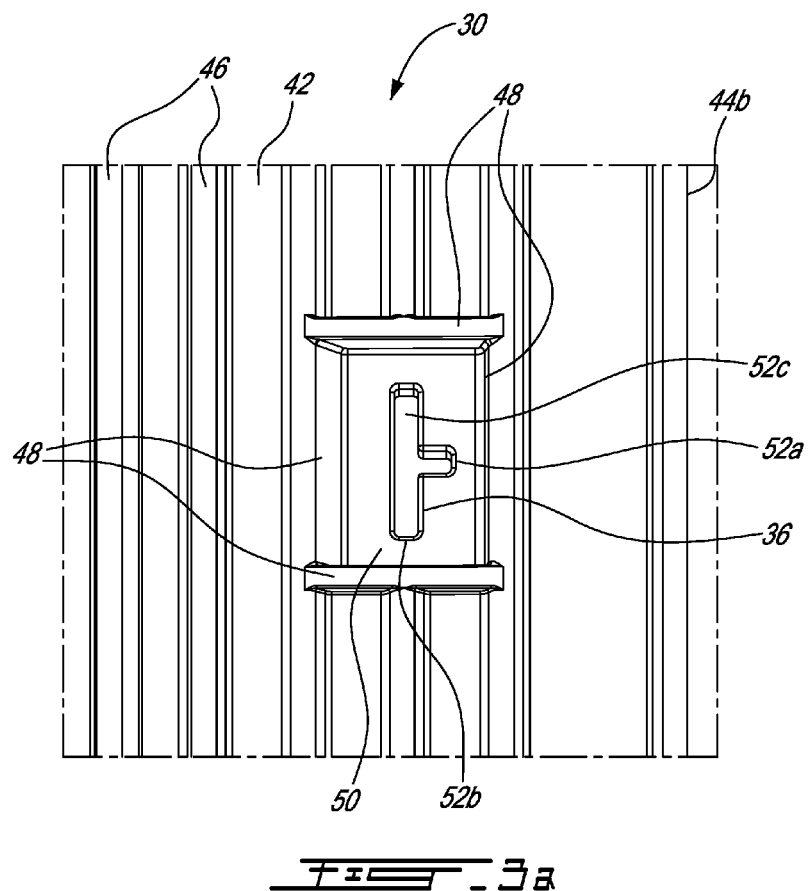
FIG. 3a is a detail view taken from enclosure 3a in FIG. 2.

The non-restrictive illustrative embodiment of the connector for drainage conduits will first be described with reference to FIGS. 1-8 of the appended drawings.

Referring to FIGS. 1 to 5, the connector is generally identified by the reference 30 and is mountable to drainage conduits, generally identified by the references 31 and 32 (only 31 shown in FIGS. 1 to 3). In the illustrated non-restrictive illustrative embodiment, the connector 30 includes a body 34, four apertures 36 and four fasteners such as clips 38 (only one shown in FIGS. 4 and 5).

The body 34 is generally hollow and cylindrical such as to define an inner passage 39, and is made of polyethylene or other materials typically used for drainage conduits. Such other materials include, but are not limited to, metals, alloys and rubber.

The body 34 includes an inner surface 40, an outer surface 42, a stopper 43 and two extremities 44a, 44b. The inner surface 40 is generally smooth and the outer surface 42 is provided with ribs 46 for transversally reinforcing the connector 30. The apertures 36 are found in cavities 50 defined by walls 48. The cavities 50 are generally free of ribs 46.

Figure 3B:
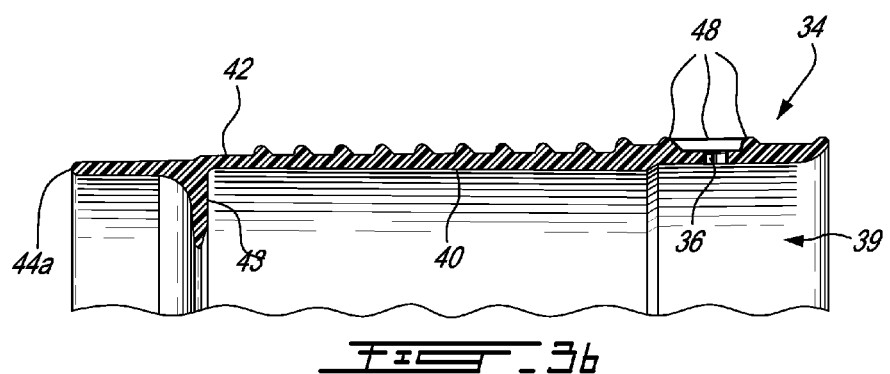
FIG. 3b is a section view taken along line 3b-3b in FIG. 2.

The stopper 43, as illustrated in FIG. 3b, protrudes internally from the inner surface 40 along the periphery of the passage 39 and, in the illustrative embodiment, in proximity of the extremity 44a. The stopper 43 is generally formed integral with the body 34 and extends a predetermined length which depends upon the configuration of the conduits 31, 32, as will be explained further below.

As illustrated in more details in FIGS. 3a and 3b, the aperture 36 has a t-shape configuration, corresponding to cross-sections of the clip 38, thereby allowing the insertion of the clip 38 in the connector 30, as will be explained further below. Of course, other shape configurations of the aperture 36 are possible, such as, for example, i-shape, u-shape, v-shape, y-shape, and round and square shapes. In the illustrative embodiment, the aperture 36 includes three slits 52a, 52b, 52c which open through the body 34.

As illustrated in more details in FIGS. 4 and 5, the clip 38 includes a top portion 54, a bottom portion 56 and a breakable portion 58. The top portion 54 is configured and sized so as to be encapsulated, generally for protection, in the cavity 50 and as to mate with the outer surface 42 of the body 34. For instance, the top portion 54 is provided with curved edges 54a, 54b corresponding to the curved periphery of the outer surface 42.

The bottom portion 56 includes wings 60a, 60b, 60c so configured and sized as to matingly cooperate with a respective slit 52a, 52b, and 52c. In the illustrative embodiment, the wings 60a, 60b, 60c have a constant thickness and the wings taper down from the breakable portion 58 such that the width of each wing is larger near the breakable portion 58 than at the bottom. Additionally, the length of respective slits 52a, 52b, and 52c is generally slightly smaller than the width of the corresponding wings 60a, 60b, and 60c near the breakable portion 58 and generally larger than the width of the wings 60a, 60b, and 60c at the opposite end of the bottom portion 56.

The wings 60b, 60c further include recesses 62b, 62c near the breakable portion 58 that provide mechanically compliant protrusions 64b, 64c.

The breakable portion 58 includes a neck 66 and two grooves 68a, 68b. The neck 66 connects the top portion 54 to the bottom portion 56, and the grooves 68a, 68b are positioned on the neck 66 so as to engage the aperture 36 and so as to define a thinner section 70 of the neck 66. The thinner area 70 is breakable upon a loading force, as will be explained further below.

From the top portion 54 to the bottom portion 56, the clip 38 generally extends up to a certain length which depends upon the configuration of the conduits 31, 32, as will be explained further below.

As illustrated in FIGS. 6, 7 and 8, the connector 30 is configured and sized so as to be removably mounted to drainage conduits 31, 32. Each drainage conduit 31, 32 generally includes an outer surface 72 defining successive and alternating annular peaks such as 74 and annular valleys such as 76.

The transversal distance $d_{trans}$ corresponding to a distance between the top of a peak and the bottom of a valley is generally deep enough to receive the clip 38 and the stopper 43, as will be explained further below. In the illustrative embodiment, only a portion of each of the conduits 31, 32 is shown, including their respective ends 31a, 32b to be interconnected, which ends define, respectively, peaks 74a, 74b and valleys 76a, 76b (FIG. 6).

In operation, the connector 30 is mountable to the drainage conduits 31, 32 as follows. As shown in FIGS. 6 and 7, the end 31a of the first drainage conduit 31 is sealingly mounted to the connector 30 by being welded, glued or otherwise adhered to the inner surface 40 of the body 34, after being freely inserted in the passage 39 from the extremity 44a, and generally, after abutment of the first peak 74a with the stopper 43.

From FIG. 7, the other conduit 32 is then pushed in the passage 39, from the extremity 44b of the body 34, until abutment of the valley 76b of the conduit 32 with the valley 76a of the conduit 31 occurs. Of course, should the conduit 32 be so cut that the end 32b begins by a peak 74b (which is not the case in the appended drawings), this peak 74b would abut with the stopper 43.

At that time, the clips 38 (only one shown) are ready to be inserted in the apertures 36 (only one shown). For simplicity, the insertion of only one clip 38 in the connector 30 will now be explained.

As illustrated in FIG. 8, the clip 38 is inserted in the aperture 36, such that the wings 60a, 60b, 60c are each slidably engaged within respective slits 52a, 52b, and 52c. At that time, if the clip 38 interferes with a peak 74 (which is not the case in the appended drawings), the conduit 32 may slightly be pulled out of the connector 30 until a valley 76 faces the aperture 36.

As the clip 38 is pushed inside the aperture 36, the width of the wings 60a, 60b, 60c engaging the respective slits 52a, 52b, 52c enlarges, until interference occurs between the wings 60a, 60b, 60c and the respective slits 52a, 52b, 52c.

As the clip continues to be pushed inside the aperture 36, the mechanically compliant protrusions 64b, 64c of the wings 60b, 60c are deformed toward the recesses 62b, 62c, until the grooves 68a, 68b engage the body 34 at the periphery of the aperture 36 and until the protrusions 64b, 64c of the wings 60b, 60c and the wing 60a clear the aperture 36 and reach the passage 39. At that time, the mechanically compliant protrusions 64b, 64c regain their original configuration.

As a result, the clip 38 has its top portion 54 generally maintained in the cavity 50, its breakable portion 58 generally located at the level of the body 34 and the bottom portion 56 is positioned in the passage 39 and faces a valley 76 without interference with the peak 74c located in between.

If the conduit 32 needs to be removed from the connector 30, a loading force may be applied at the top portion 54 of the clip 38, by hand or with tools, such as, for example, with a screwdriver, a knife, or pliers. At a certain level, the loading force transmitted as an axial or shear force at the neck 66 of the breakable portion 58 is enough to break the clip 38, generally at the thinner area 70 and in between the grooves 68a, 68b.

At that time, the top portion 54 is removable from the connector 30 and the bottom portion 56 is free to fall within a valley 76. The conduit 32 may then be removed from the connector 30 by being pulled out from the passage 39.

The conduit 32 may therefore be changed and/or reassembled to the connector 30 by following the method described above.

Figure 9:
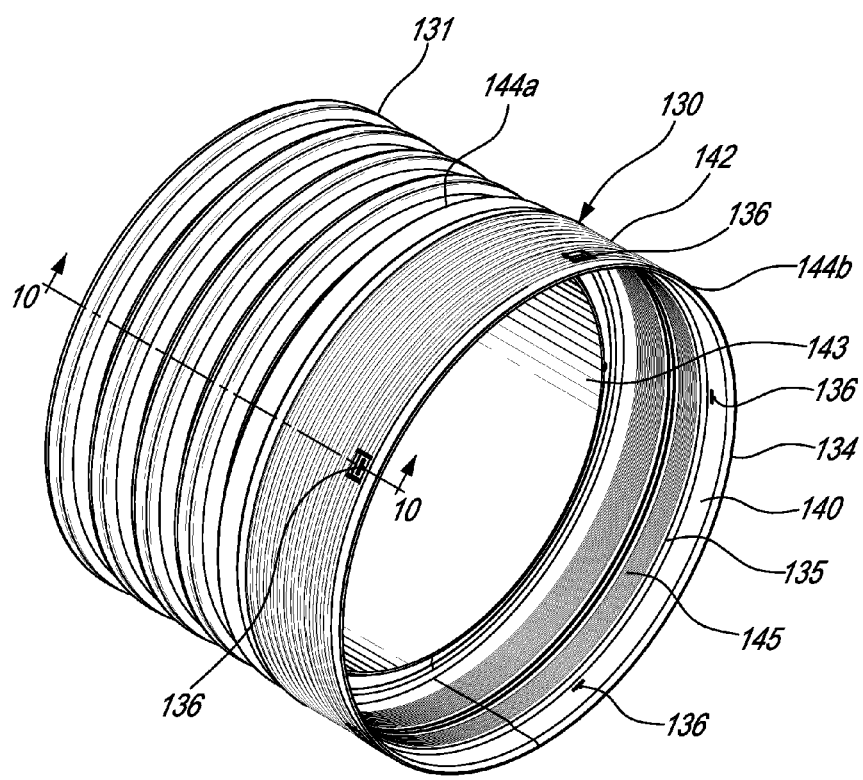
FIG. 9 is a perspective view of a connector according to a second illustrative embodiment of the present invention.
Figure 10:
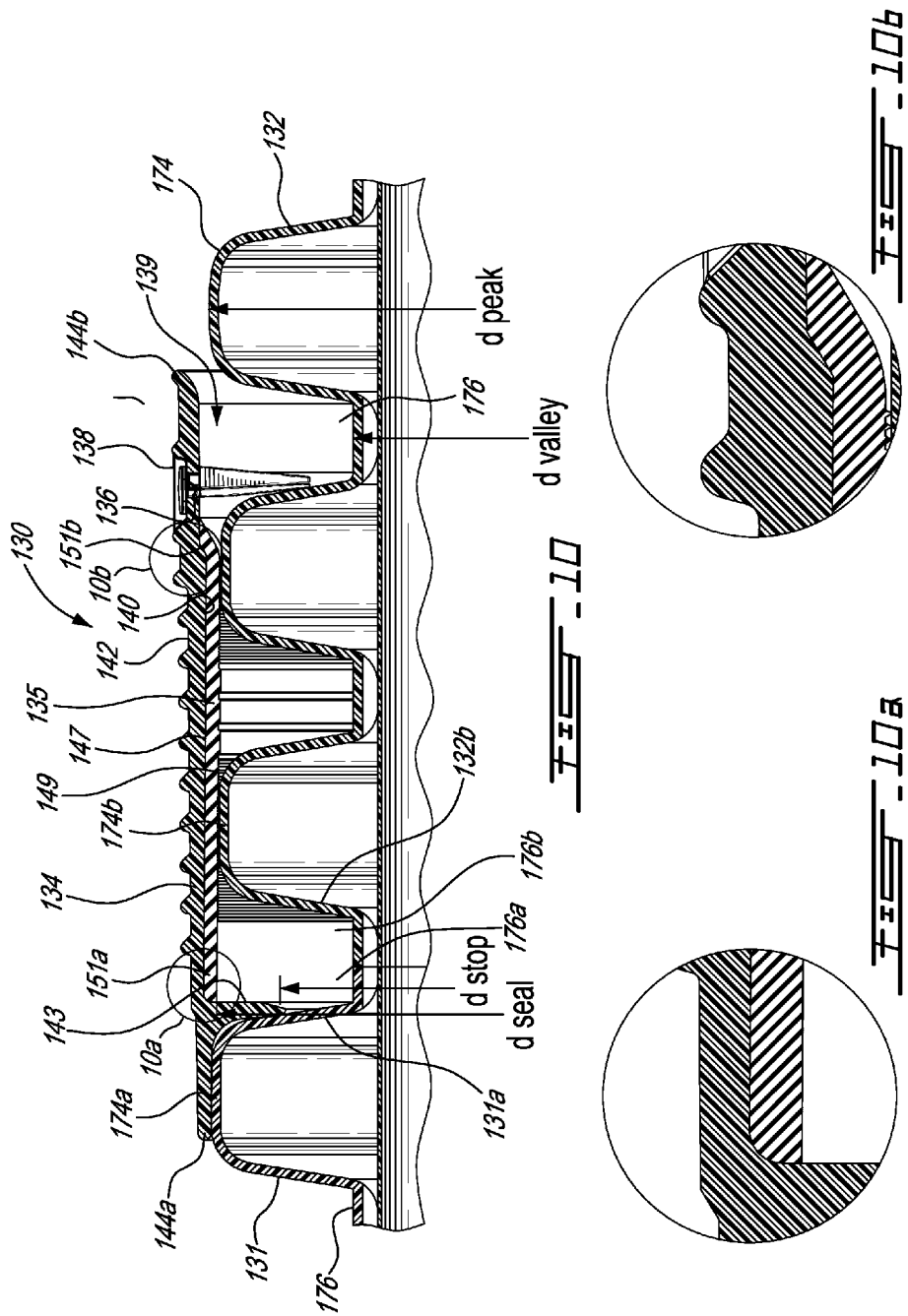
FIG. 10 is a partial section view taken along line 10-10 in FIG. 9 and showing two drainage conduits assembled via the connector.

A connector 130 according to a second illustrative embodiment of the present invention is illustrated in FIGS. 9 and 10. For simplicity, only the differences between the connector 130 and the connector 30 illustrated in FIGS. 1 to 8 will be described hereinbelow.

In this second non-restrictive illustrative embodiment, the connector 130 includes a body 134, an inner seal member which is flexible and resilient such as gasket 135, four apertures 136 and four clips 138 (only one shown in FIG. 10).

The body 134 includes an inner surface 140, an outer surface 142, a stopper 143 and two extremities 144a, 144b. The inner surface 140 is generally smooth and optionally, mechanically or chemically prepared for receiving the gasket 135. The stopper 143 internally protrudes from the body 134 in the passage 139 and up to a predetermined height, defining a stopper inner diameter $d_{stop}$.

The gasket 135 includes an adhering surface 147 facing the inner surface 140 and an opposite sealing surface 149.

The adhering surface 147 is generally smooth and optionally, mechanically or chemically prepared for being mounted to the body 134. The sealing surface 149 defines, in the passage 139, a sealing diameter $d_{seal}$, and is generally flat, smooth and optionally, tapers toward the adhering surface 147 at the ends 151a, 151b of the gasket 135.

The gasket 135 may be manufactured from a variety of materials, such as, for example, polypropylene, polyethylene, TPE (Thermo Plastic Elastomer) or any other mechanically compliant material capable of deforming under a loading force while maintaining a level of physical integrity, and capable of generally returning to its original configuration when the loading force is no longer applied.

The gasket 135 is fixedly mounted on the inner surface 140 of the body 134, at a predetermined position in between the two extremities 144a, 144b. In the illustrative embodiment, the end 151a is positioned in proximity of the stopper 143 and the gasket 135 extends in the passage 139 such that its end 151b is positioned in the vicinity of the aperture 136. The gasket 135 may be assembled to the body 134 in various ways, such as, for example, by being glued, tacked, welded, heated, or thermoformed.

The peaks 174 of the conduits 131, 132 define a peak diameter $d_{peak}$ that is generally larger than or equal to the sealing diameter $d_{seal}$, and larger than the stopper diameter $d_{stop}$. The valleys 176 define a valley diameter $d_{valley}$ that is generally smaller than or equal to the stopper diameter $d_{stop}$. In the illustrative embodiment, only a portion of the conduits 131, 132 is shown, including their respective insertable ends 131a defining, respectively, peaks 174a and valleys 176a.

In operation, the conduits 131, 132 are assembled to the connector 130 in the manner described for the first embodiment of the present invention. The main difference between the two embodiments relates to the interaction between the conduit 132 and the gasket 135.

As the conduit 132 engages the passage 139, the insertable end 131a encounters a first resistance corresponding to the first peak 174a reaching and engaging the gasket 135. At that time, the tapered end 151b of the gasket 135 generally helps to realign the conduit 132 with respect to the sealing surface 149 by contact with the first peak 174a.

If the peak diameter $d_{peak}$ is generally equal to the sealing diameter $d_{seal}$, a friction-like first resistance will be felt as the conduit 132 continues to be pushed within the passage 139. If the peak diameter $d_{peak}$ is generally larger than the sealing diameter $d_{seal}$, the first resistance will mainly consist of the deformation of the gasket 135.

The conduit 132 continues to be pushed inside the passage 139 until a second resistance is felt, corresponding to a contact between the first valley 176b of the conduit 131 and the first valley 176a of the conduit 132, as illustrated in FIG. 10. Of course, should the conduit 132 be so cut that the end 132b begins by a peak 174b (which is not the case in the appended drawings), this peak 174b would interfere with the stopper 43.

This interference generally provides an indication that the conduit 132 has reached an assembled position with respect to the connector 130 and generally prevents any further longitudinal movement between the two. The conduits 131, 132 are thereby sealingly mounted to the connector 130.

After being sealingly mounted to the connector 130, the conduits 131, 132 are then securely mounted to the connector 130 by inserting the clips 138 through the apertures 136, as previously disclosed.

Figure 11:
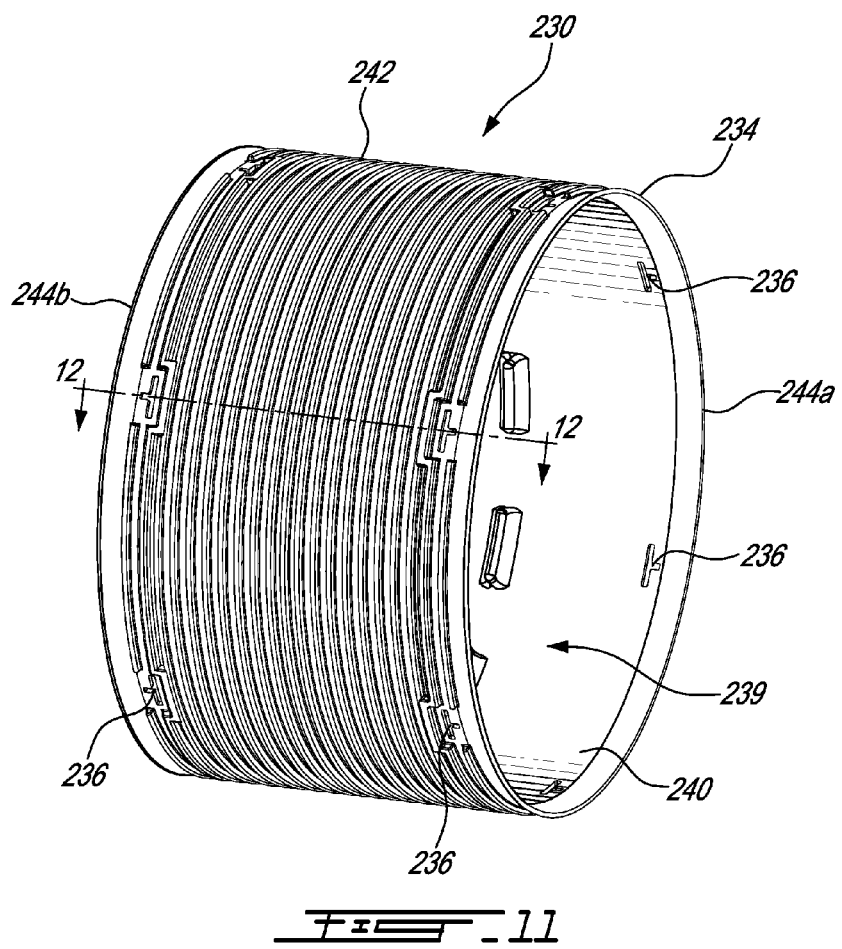
FIG. 11 is a perspective view of a connector according to a third illustrative embodiment of the present invention.
Figure 12:
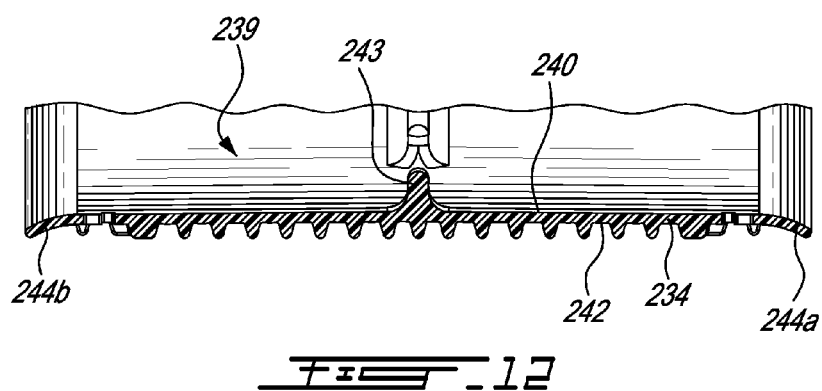
FIG. 12 is a section view taken along line 12-12 in FIG. 11.

A connector 230 according to a third illustrative embodiment of the invention is illustrated in FIGS. 11 and 12. For simplicity, only the differences between the connector 230 and the connector 30 illustrated in FIGS. 1 to 8 will be described below.

In this illustrated non-restrictive embodiment, the connector 230 includes a body 234, two sets of four apertures 236 and two sets of four clips (not shown).

The body 234 includes an inner surface 240, an outer surface 242, a stopper 243 and two extremities 244a, 244b. The stopper 243 protrudes in the passage 239, generally centrally between the extremities 244a, 244b, from the inner surface 240.

In operation, the connector 230 is mountable to the drainage conduits (not shown in these figures for clarity), as previously disclosed in the first embodiment. A difference between the previous embodiments pertains to the provisions of the two sets of apertures 236 and the generally centrally located stopper 243.

This configuration allows the assembly and disassembly of two ends of conduits (not shown) in the passage 239, through each of the two extremities 244a, 244b, until abutment occurs between the stopper 243 and the respective first peaks (not shown) of the conduits, or until interference of the respective first valleys (not shown) of the conduits.

One skilled in the art will appreciate that the body may adopt various shapes, sizes and material configurations that generally correspond to the shapes, sizes and material configurations of the drainage conduits with which they are destined to be used. Similarly, one skilled in the art will appreciate that the gasket may adopt various shapes, sizes and material configurations that generally correspond to the shapes, sizes and material configurations of the body with which they are destined to be assembled.

One skilled in the art will further understand that the number, the shape and the configuration of the apertures and clips may vary as long as they are able to matingly cooperate with one another in order to allow the assembly and disassembly of the connector with the conduits.

A fourth non-restrictive illustrative embodiment of the connector for a drainage conduit will now be described with reference to FIGS. 12-17 of the appended drawings.

Figure 13:
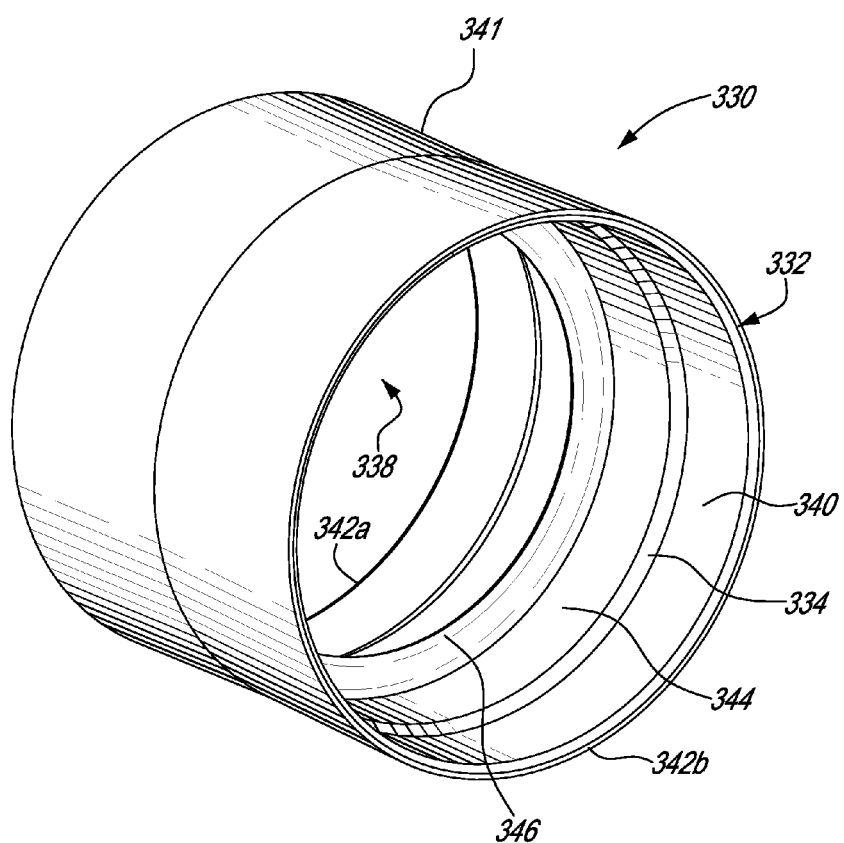
FIG. 13 is a perspective view of a connector according to a fourth illustrative embodiment of the present invention.

Referring to FIGS. 13, 14 and 15, the connector is generally identified by the reference 330. In the illustrated non-restrictive illustrative embodiment, the connector 330 includes a body 332 and a seal member 34. In the illustrated non-limiting example, the seal member is a flexible and resilient seal in the form of a gasket for example.

The body 332 is generally hollow and cylindrical such as to define an inner passage 338, and is fabricated from, for example, polyethylene, polypropylene or other typically used drainage conduit material.

The body 332 is cylindrical and includes an inner surface 340, an outer surface 341 and two annular ends 342a and 342b. The inner surface 340 is generally smooth and optionally mechanically or chemically prepared for receiving the gasket 334.

The gasket 334 includes a base portion 344 and a stopper 346. The base portion 344 has a generally cylindrical shape corresponding to the shape of the body 332. The base portion 344 includes an adhering surface 48 facing the body 332 and a sealing surface 350 facing the passage 338.

The gasket adhering surface 348 is generally smooth and optionally mechanically or chemically prepared for being mounted to the body 332. The sealing surface 350 defines in the passage 338 a sealing diameter $d_{seal}$, and is generally smooth and optionally tapers toward the adhering surface 348 at the ends 352a and 352b of the base portion 344.

The stopper 346 protrudes from the sealing surface 350 along the circumference of the passage 338 and up to a height defining a stopper diameter $d_{stop}$ in the passage 338. In the illustrative embodiment, the stopper 346 is continuous, annular and generally centrally located with respect to the two ends 352a and 352b.

The gasket 334 is fabricated from, for example, polypropylene, polyethylene, TPE (Thermo Plastic Elastomer) or any other suitable, mechanically compliant material capable of deforming under a load while maintaining a level of physical integrity. The material from which the gasket is made will also be resilient, i.e. capable of substantially returning to its original shape and configuration as soon as the load is released.

The gasket 334 is fixedly mounted on the inner surface 40 of the body 332 at a predetermined position, for example a generally central position in between the two ends 342a and 342b. The gasket 334 may be assembled to the body 332 in various ways such as, for example, gluing, heat welding, over-molding, and any other assembling process known in the art.

Figure 16:
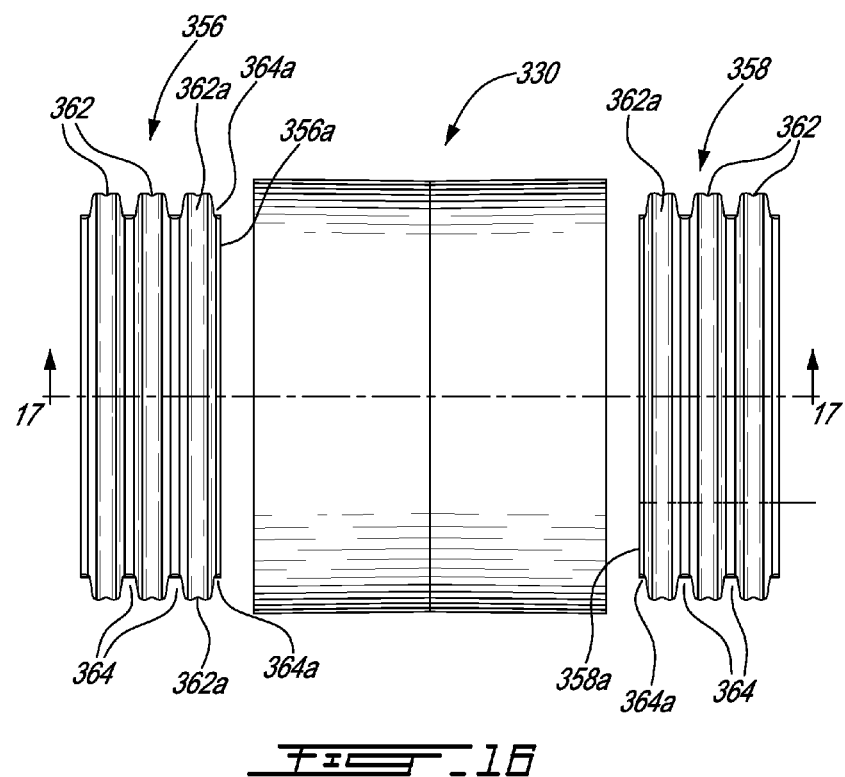
FIG. 16 is a side elevation view showing a drainage conduit being assembled to the connector of FIG. 13.
Figure 17:
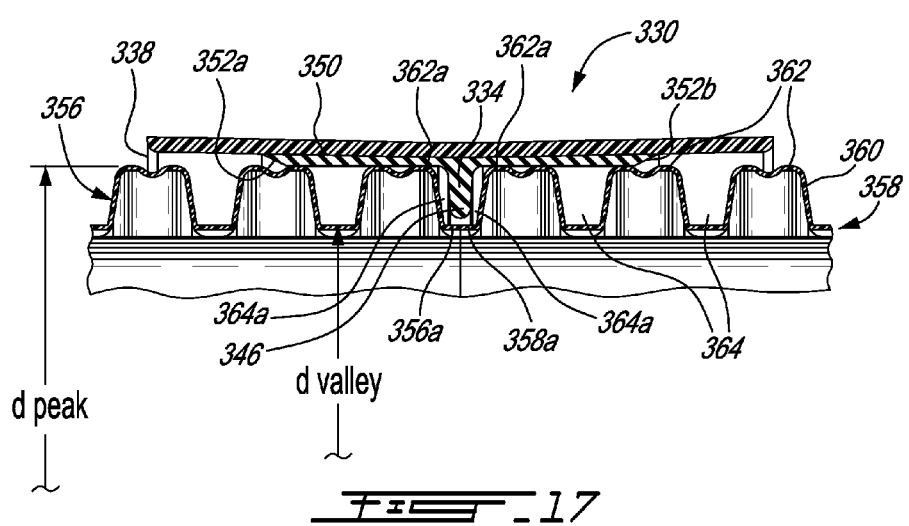
FIG. 17 is a section view taken along line 17-17 of FIG. 16.

As illustrated in FIGS. 16 and 17, the connector 330 is configured and sized so as to receive conduits such as drainage conduits 356 and 358. Each drainage conduit 356, 358 generally includes an outer surface 360 defining successive and alternating annular peaks such as 362 and annular valleys such as 364.

The peaks 360 define a peak diameter $d_{peak}$ that is slightly larger than or equal to the sealing diameter $d_{seal}$, and larger than the stopper diameter $d_{stop}$. The valleys 362 define a valley diameter $d_{valley}$ that is generally smaller than or equal to the stopper diameter $d_{stop}$.

In the illustrative embodiment, only a portion of the conduits 356, 358 is shown, including their respective proximal ends 356a, 358a defining first respective peaks 360a and valleys 362a.

In operation, the connector 330 is installed on the end 356a, 58a of the drainage conduits 356, 358 as follows. The end 356a, 358a of the drainage conduit 356, 358 is freely inserted in the passage 338 of the connector 330 until the conduit 356, 358 encounters a resistance corresponding to the first peak 362a reaching and engaging the gasket 334. At that time, the tapered end 352a, 352b of the gasket 344 generally helps to realign the conduit 356, 358 with respect to the sealing surface 350 by contact with the first peak 362a.

If the peak diameter $d_{peak}$ is generally equal to the sealing diameter $d_{seal}$, a friction-like resistance will be felt as the conduit 356, 358 continues to be pushed within the passage 338. If the peak diameter $d_{peak}$ is generally larger to the sealing diameter $d_{seal}$, the resistance will cause deformation of the base portion 44 of the gasket 34 to provide a better seal.

The conduit 356, 358 continues to be pushed inside the passage 338 until the first peak 362a abuts against the stopper 346. The stopper 346 provides an indication that the conduit 356, 358 has reached an assembled position within the connector 330 and prevents any further longitudinal movement of the conduit 356, 358 within the joint 330.

As shown in FIG. 16 and as described in the foregoing description, the two conduits 356, 358 are assembled in a similar way on opposite sides of the connector 330.

If the ends 356a, 358a cut a portion of respective first peaks 362a, the connector 330 will generally provide a leakproof joint between the two conduits 356, 358 after abutment of respective first peaks 362a with the stopper 346 and by the hereinabove described sealing contact of the peaks 62 with the sealing surface 350.

If the ends 356a, 358a cut a portion of respective first valleys 364a, the connector 330 will also generally provide a leakproof joint between the two conduits 356, 358. However, for conduit 358, the hereinabove described resistance caused by the abutment of the peak 362a with the stopper 346 will in place occur by interference between the first valleys 364a of the conduits 356, 358.

As a result, the conduit 356 may slightly be pushed backward in the passage 338 or the conduit 358 may be prevented from having its first peak reach the stopper 346. In both cases, the hereinabove described sealing contact is still provided between the peaks 362 and the sealing surface 350.

A connector 430 according to a fifth embodiment of the invention is illustrated in FIGS. 18 to 21. For concision purposes, only the differences between the connector 430 and the connector 330 illustrated in FIGS. 13 to 17 will be described hereinbelow.

In this illustrated, second non-restrictive illustrative embodiment, the connector 430 includes a body formed of two members 432, 433, a gasket 434 and a sleeve 436.

The sleeve 436 is generally cylindrical to correspond to the shape of the two members 432, 433. The sleeve 436 includes an adhering surface 437 facing the inner surface 440 of each of the two members 432, 433, a first intermediate surface 439 facing the passage 438 defined by the connector 430 and radially extending supports 441 that protrudes from the first intermediate surface 439.

In the illustrative embodiment, four supports 441 (only three shown in FIG. 20) are equally spaced apart along the circumference of the passage 438 and the sleeve 436 is generally positioned with respect to the two members 432, 433 such that the supports 441 are centered with respect to a junction 443 between the two members 432, 433.

The sleeve 436 is fabricated, such as for example, from charged polypropylene or from other materials generally stiffer than the two members 432, 433 and stiffer than the gasket 434. The sleeve 436 is therefore capable of reinforcing the joint assembly 430 and of minimizing the stretching of the two members 432, 433, at the junction 443, when the joint assembly 430 is subjected to a load such as, for example, a pressure inside the passage 438. Further, the sleeve 436 may be provided with a coating such as, for example, a resin coating for facilitating its assembly to the members 432, 433 and to the gasket 434.

The gasket 434 includes a base portion 444 and stoppers 446. The base portion 444 is generally cylindrical to correspond to the shape of the sleeve 436. The base portion 444 includes a second intermediate surface 448 facing the first intermediate surface 439 of the sleeve 436 and a sealing surface 450 facing the passage 338.

In the illustrative embodiment, the four stoppers 446 are generally hollow and protrude from the base portion 444 such as to define four cavities 445 for receiving and encapsulating the corresponding supports 441 therein. The encapsulation of the supports 441 generally provides stiffer stoppers 446.

The sleeve 436 is mounted on the inner surface 440 of the two members 432, 433, at a predetermined position in between the respective extremities 442a, 442b of the members 432, 433 and such as to overlap the junction 443. The gasket is mounted on the surface 439 of the sleeve 436 and the surface 440 of the members 432, 433 so as to cover the surface 439 and the joints between the sleeve 436 and the members 432, 433. Again, processes such as gluing, heat welding, over-molding, etc., can be used to complete this assembly.

When the sleeve 436 is covered with a resin coating, a heating process can provide an optimized uniform adherence between the various components, in particular at the junction 443 between the two members 432, 433.

Figure 22:
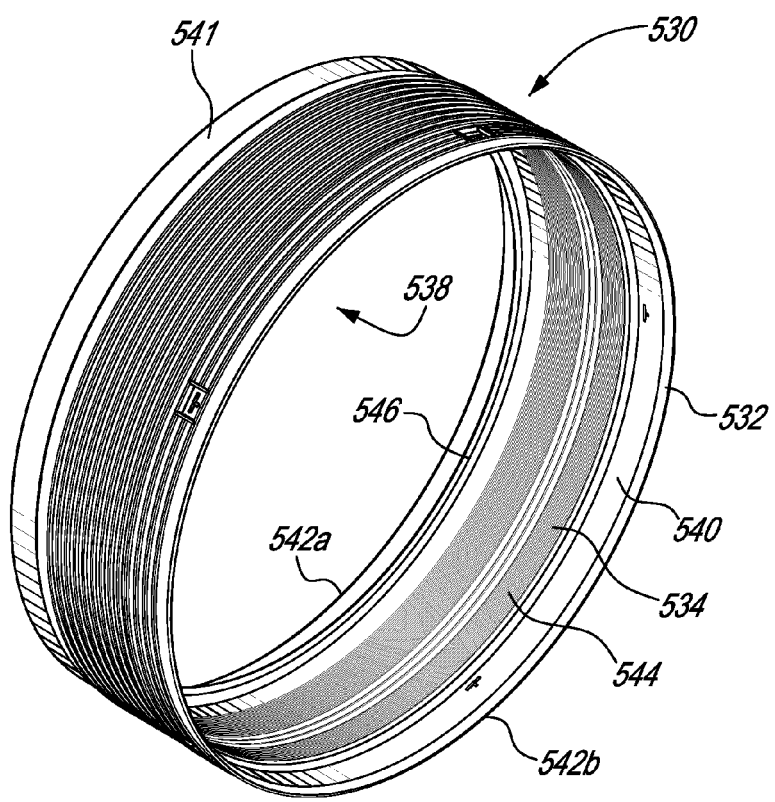
FIG. 22 is a perspective view of a connector according to a sixth illustrative embodiment of the present invention.

A connector 530 according to sixth embodiment of the invention is illustrated in FIGS. 22 to 24. For concision purposes, only the differences between the connector 530 and the connector 330 illustrated in FIGS. 13 to 17 will be described hereinbelow.

In the illustrated non-restrictive illustrative embodiment, the connector 530 includes a body 532 and a gasket 534.

The body 532 is cylindrical and includes an inner surface 540, an outer surface 541, a stopper 546 and two extremities 542a, 542b. The stopper 546 is annular and protrudes into the passage 538 from the inner surface 540 and in the proximity of the end 542a and can advantageously be formed integral with the body 532.

The gasket 534 includes a cylindrical base portion 544 extending from the stopper 546 to a position proximate the second end 542b of the body 532.

In operation, as illustrated in FIGS. 23 and 24, the connector 530 is mounted to the drainage conduits 556, 558 as follows. The end 556a of the first drainage conduit 556 is fixedly and generally sealingly mounted to body 532 and stopper 546 of the connector 530 through welding, gluing or other adequate process after having been inserted in the passage 538 and abutted to the stopper 546. An alternative is to form the body 532 integral with the conduit 556.

As shown in FIG. 24, the other conduit 558 may then be assembled by being pushed into the passage 538, by interacting with the gasket 534 and by abutting with the stopper 546 on the other side of the connector 530, as described in the first embodiment.

A connector 630 according to a seventh embodiment of the invention is illustrated in FIG. 25. For concision purposes, only the differences between the connector 630 and the connector 330 illustrated in FIGS. 13 to 17 will be described hereinbelow.

In the non-restrictive illustrative embodiment, the connector 630 includes a body 632 and a gasket 634.

The body 632 includes an inner surface 640 defining a passage 638, and two extremities 642a, 642b. The extremity 642a is formed integral with one end 656a of a first drainage conduit 656, and extends from the end 656a such as to define a peak 662a and a valley 664a, generally in continuation with the succession of peaks 662b, 662c and valleys (only 664b shown) of the first drainage conduit 656.

The peak 662a provides a stopper wall 646 inside the passage 638 for abutment with a second drainage conduit (not shown) inserted therein according to the hereinabove described method of operation of the connector 330.

In the illustrative embodiment, the peak 662a has a diameter $d_{joint}$ which is generally larger than the diameter $d_{peak}$ of the other peaks 662b, 662c. This way, the second drainage conduit (not shown), having a diameter generally similar to the diameter $d_{peak}$ of the first drainage conduit 656, may be inserted in the passage 638 in cooperation with the gasket 634.

Alternatively, the peak 662a may have a diameter $d_{joint}$ which is generally smaller than the diameter $d_{peak}$, such that the second drainage conduit (not shown), having a diameter generally smaller than the diameter $d_{peak}$, may be inserted in the passage 638 in cooperation with the gasket 634. For instance, if $d_{joint}$ falls in between $d_{peak}$ and $d_{valley}$, abutment between the second drainage conduit (not shown) with the stopper wall 646 is provided when the second drainage conduit (not shown) is inserted in the passage 638.

One skilled in the art will easily understand that the body 332 may adopt various shapes, sizes and material configurations that generally correspond to the shapes, sizes and material configurations of the drainage conduits with which they are destined to be used. Similarly, one skilled in the art will easily understand that the gasket 334 may adopt various shapes, sizes and material configurations that generally correspond to the shapes, sizes and material configurations of the body 332 with which they are destined to be assembled.

One skilled in the art will further easily understand that the final configuration of the gasket 334 may be obtained at the time that the gasket 334 is mounted to the body 332. For example, the stopper 346 and the tapered ends 352*a*, 352*b* may be formed during the assembly of the gasket 334 to the body 332.

A connector 730 according to an eighth embodiment of the invention is illustrated in FIGS. 26, 27 and 28. The connector 730 is similar to connector 30 and for concision, mostly differences therewith with be described herein.

In the non-restrictive illustrative embodiment, the connector 730 includes a body 732 having apertures 734, clips 735 (see FIGS. 36 and 37), outer and inner surfaces 736 and 738 respectively as well as two extremities 740*a* and 740*b*. The outer surface 736 includes reinforcing ribs 742. The inner surface includes a seal member 744 that is flexible and resilient as well as an annular protruding stopper 746 adjacent to the seal member 744. In this non-limiting example, the seal member 744 comprises a gasket.

With particular reference to FIGS. 27 and 28, the body 732 comprises a flexion zone 748, a reinforcing zone 750 and a welding zone 752. The flexion zone 748 provides for the body 732 to slightly expand in length (as defined by the distance between 740*a* and 740*b*). The reinforcing zone 750 comprises areas 751 which are thicker than the flexion zone 748. The reinforcing zone provides for controlling the expansion of the body 732 in order to maintain tightness when coupled to a drainage conduit. Hence, the entry 740*a* is more closed or tapered than the contact area. The welding area 752 provides for being welded with a drainage conduit by a variety of processes known in the art such as spin welding, butt welding, extrusion welding to name but a few non-limiting examples.

Figure 29:
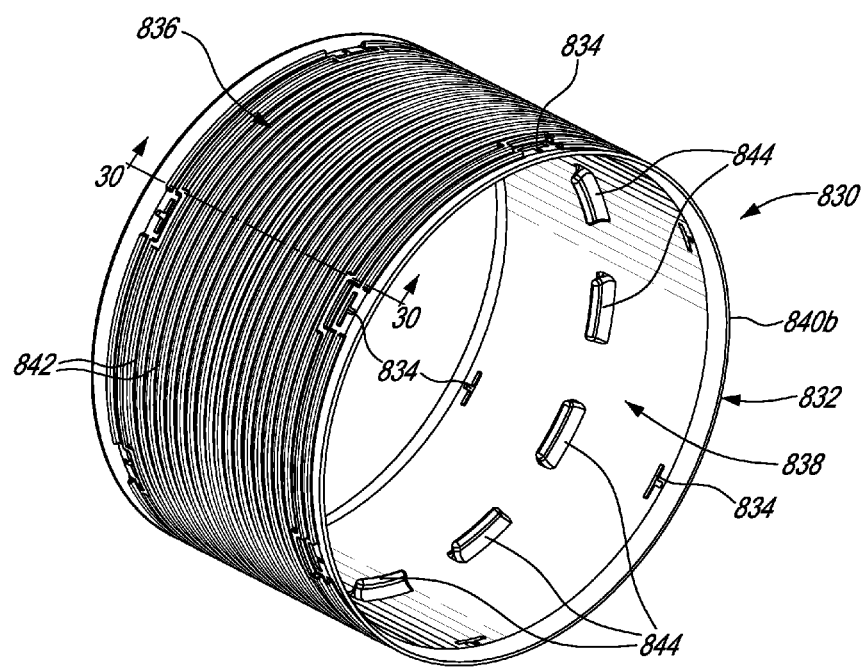
FIG. 29 is a perspective view of a connector according to a ninth illustrative embodiment of the present invention.
Figure 30:
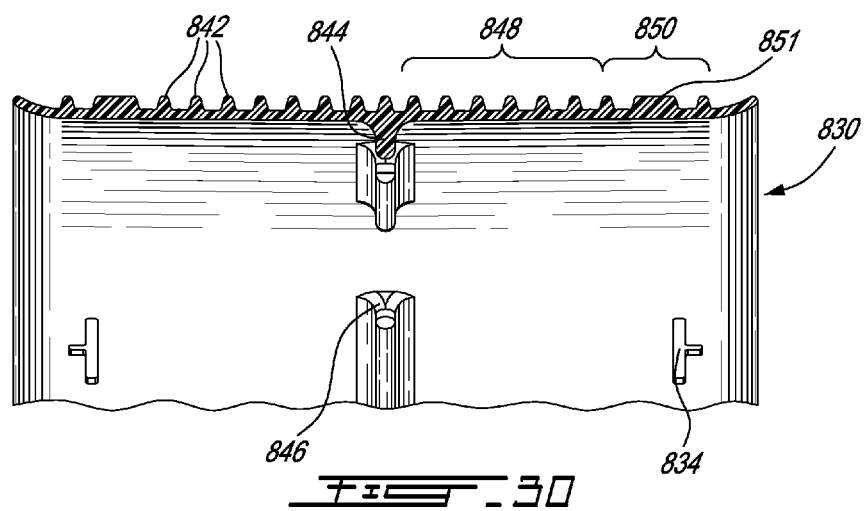
FIG. 30 is a front sectional view of FIG. 29 taken along line 30-30.
Figure 33A:
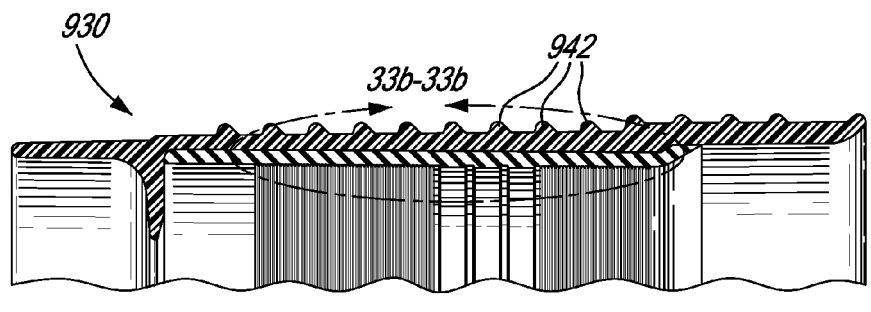
Figure 33B:
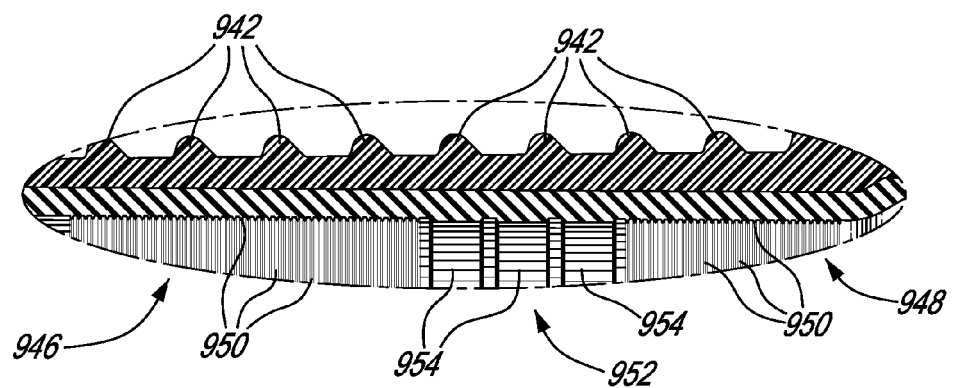

A connector 830 according to a ninth embodiment of the invention is illustrated in FIGS. 29 and 30.

In the non-restrictive illustrative embodiment, the connector 830 includes a body 832 having apertures 834, clips 735 (see FIGS. 36 and 37), outer and inner surfaces 836 and 838 respectively as well as two extremities 840*a* and 840*b*. The outer surface 836 includes reinforcing ribs 842. The inner surface 838 includes a generally smooth surface having a plurality of stoppers 844 on the same annular position along the inner circumference thereof about the middle between the distance of extremities 840*a* and 840*b*.

With particular reference to FIG. 30, the body 832 comprises a flexion zone 848 and a reinforcing zone 850 having thicker portion 851.

A connector 930 according to a tenth embodiment of the invention is illustrated in FIGS. 31, 32, 33*a* and 33*b*.

In the non-restrictive illustrative embodiment, the connector 930 includes a body 932 having apertures 934, clips 735 (see FIGS. 36 and 38), outer and inner surfaces 936 and 938 respectively as well as two extremities 940*a* and 940*b*. The outer surface 936 includes reinforcing ribs 942. The inner surface includes a seal member 944 that is flexible and resilient. In this non-limiting example, the seal member 944 comprises a gasket. Gasket 944 includes additional friction areas 946 and 948 having ribs 950. A median are 952 between additional friction areas 946 and 948 includes annular protrusions 954. The ribs 950 provide for a greater tightness or sealing with a drainage conduit that often has an imperfect outer surface.

Figure 34:
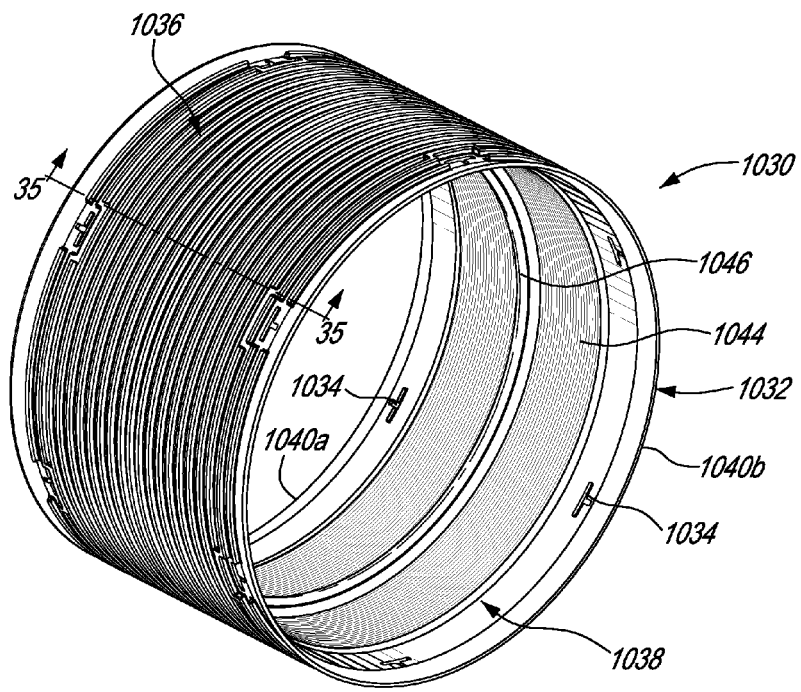
FIG. 34 is a perspective view of a connector in accordance with a eleventh illustrative embodiment of the present invention.
Figure 35:
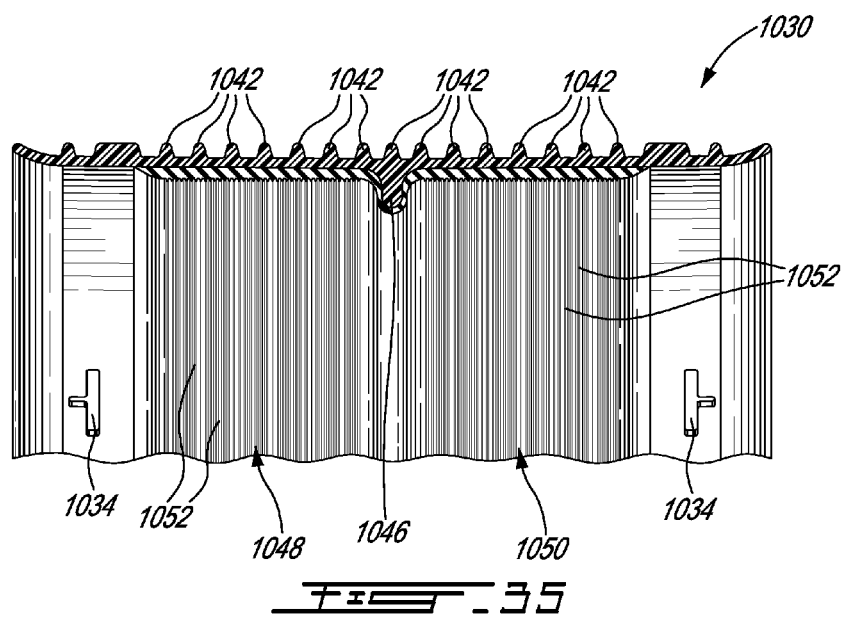
FIG. 35 is a front sectional view of FIG. 34 taken along line 35-35.

A connector 1030 according to an eleventh embodiment of the invention is illustrated in FIGS. 34 and 35. Connector 1030 is similar to connector 330 and differences therewith will be described hereinbelow.

In the non-restrictive illustrative embodiment, the connector 1030 includes a body 1032 having apertures 1034, clips 735 (see FIGS. 36 and 37), outer and inner surfaces 1036 and 1038 respectively as well as two extremities 1040*a* and 1040*b*. The outer surface 1036 includes reinforcing ribs 1042. The inner surface includes a seal member 1044 that is flexible and resilient. In this non-limiting example, the seal member 1044 comprises a gasket. The gasket 1044 includes a central annular protrusion 1046 which acts as a stopper. The gasket 1044 includes additional friction areas 1048 and 1050 flanking both sides of the annular stopper 1046. The additional friction areas 1048 and 1050 include ribs 1052.

Figure 36:
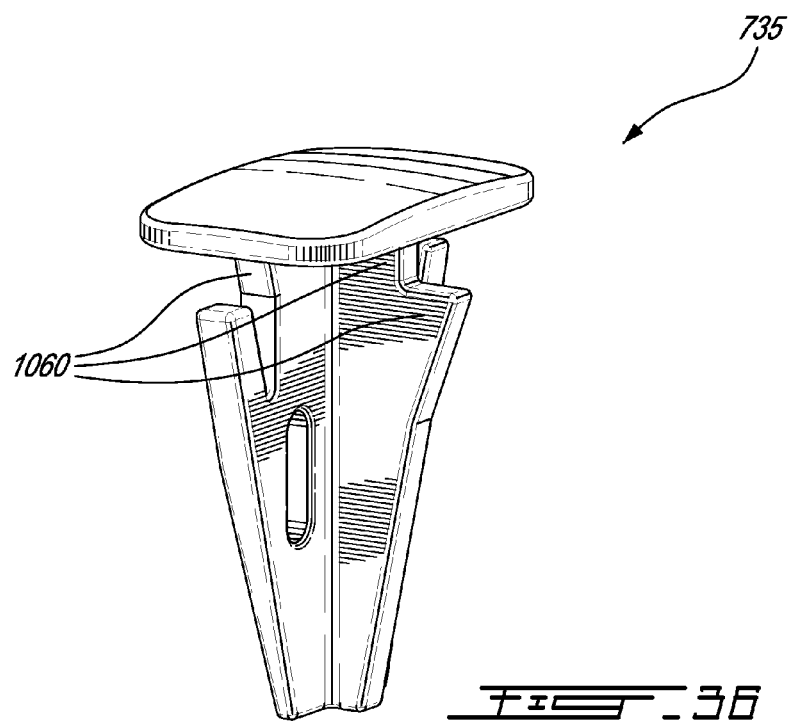
FIG. 36 is a perspective view of a clip used in the invention in accordance with an embodiment thereof.
Figure 37:
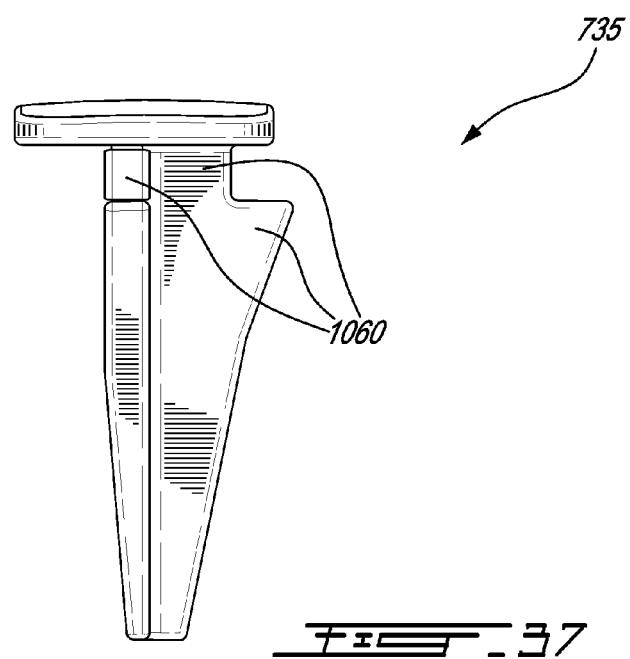
FIG. 37 is a side elevational view of the clip of FIG. 36.

Referring now to FIGS. 36 and 37, clips 735 are illustrated in accordance with an embodiment of the invention. Clips 735 are similar to clips 38 except that clips 735 do not include breakable weak portions or areas but reinforcement portions 1060 for strong mounting to drainage conduits.

It should be noted that the various features, elements and characteristics of the connectors 30, 130, 230, 330, 430, 530, 630, 730, 830, 930 and 1030 described above, whether illustrated or otherwise disclosed herein can be combined in a variety of ways within the context of the present invention so as to provide a variety of alternative connectors within the scope of the present invention.

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of embodiments thereof, it can be modified, without departing from the spirit, scope and nature of the subject invention.

What is claimed is:

1. A connector for connecting corrugated drainage conduits having alternating annular peaks and valleys, a central top portion of the annular peaks defining an outer diameter of the drainage conduits, the connector comprising:

a rigid tubular body comprising opposite first and second conduit-receiving sections with respective opposite extremities, the first conduit-receiving section being configured to receive an end of a first drainage conduit inserted through its extremity, an internal length of the first conduit-receiving section allowing insertion of the central top portion of at least one annular peak of the first drainage conduit, the first conduit-receiving section having an inner diameter defined by an inner surface of the tubular body, the inner diameter of the first conduit-receiving section being sized for making direct contact with the central top portion of the at least one annular peak of the first drainage conduit when the central top portion of the at least one annular peak of the first drainage conduit is received within the first conduit-receiving section to allow the central top portion of the at least one annular peak of the first drainage conduit to be welded or glued to the inner surface of the tubular body, the second conduit-receiving section being tapered at its extremity to facilitate insertion of a second drainage conduit;

a conduit-abutting stopper, internal to the tubular body and separating the first and second conduit-receiving sections, the conduit-abutting stopper being configured to prevent further insertion of the central top portion of the at least one annular peak of the first drainage conduit from the first conduit-receiving section into the second-conduit receiving section; and a flexible annular conduit-sealing member inserted within the second conduit-receiving section, the conduit-sealing member adhering to the inner surface of the tubular body and extending between the conduit-abutting stopper and the extremity of the second conduit-receiving section, the conduit-sealing member being configured to receive an end of the second drainage conduit inserted through the extremity of the second conduit-receiving section while allowing a first annular peak and at least at part of a second annular peak of the second drainage conduit to be sealably received within the annular sealing member, the annular sealing member being tapered at its end opposite from the conduit-abutting stopper to facilitate insertion of the second drainage conduit;

wherein, in operation, the connector is structured to connect the respective ends of the first and second drainage conduits, and wherein the first and second drainage conduits do not form part of the connector.

2. The connector according to claim 1, wherein said conduit-sealing member comprises a gasket.

3. The connector according to claim 1, wherein said conduit-sealing member comprises opposite tapered ends.

4. The connector according to claim 1, wherein an inner contact surface of the conduit-sealing member comprises rib elements.

5. The connector according to claim 4, wherein said inner contact surface comprises elastomeric material.

6. The connector according to claim 1, wherein said conduit-abutting stopper comprises an annular protrusion.

7. The connector according to claim 1, wherein said conduit-abutting stopper comprises a plurality of separate and annularly aligned protruding members.

8. The connector according to claim 1, wherein said rigid tubular body has an outer rigid surface comprising thermoplastic material.

9. The connector according to claim 1, comprising a plurality of apertures provided around a circumference of the second conduit-receiving section of the tubular body, the apertures being located between an end of the conduit-sealing member and the extremity of the second conduit-receiving section, the apertures allowing insertion of fasteners within the second conduit-receiving section between two neighboring annular peaks of the second drainage conduit.

10. The connector according to claim 9, wherein the apertures are spaced from the extremity of the second conduit-receiving section of the tubular body.

11. The connector according to claim 1, wherein the conduit-sealing member is mechanically or chemically bounded to the second conduit-receiving section of the tubular body.

12. The connector according to claim 1, wherein an internal length of the second conduit-receiving section is at least twice the internal length of the first conduit-receiving section.

13. A connector for connecting conduits, the connector comprising:

a rigid body comprising opposite first and second conduit-receiving sections with respective opposite open extremities, an inner surface of the rigid body defining a smooth and uncovered first cylindrical inner surface of the first conduit-receiving section, the first cylindrical inner surface defining a first internal diameter, the inner surface of the rigid body also defining a second smooth cylindrical inner surface of the second conduit-receiving section, the second cylindrical inner surface defining a second internal diameter greater than the first internal diameter, the second conduit-receiving section being tapered at its extremity;

a conduit-abutting stopper, internal to the rigid body and separating the first and second conduit-receiving sections, the conduit-abutting stopper being configured to prevent passage between the first and second conduit-receiving sections of a cylindrical object having a diameter greater than a stopping diameter; and a flexible annular conduit-sealing member inserted within the second conduit-receiving section, the conduit-sealing member adhering to the second cylindrical inner surface of the second conduit-receiving section to form a third cylindrical inner surface, the annular sealing member being tapered at an end of the third cylindrical inner surface opposite from the conduit-abutting stopper, the third cylindrical inner surface extending between the conduit-abutting stopper and the tapered end of the annular sealing member;

wherein the third cylindrical inner surface has a third internal diameter that is either equal to the first internal diameter, or smaller than the first internal diameter but deformable to become equal to the first internal diameter; and wherein the stopping diameter is smaller than the third internal diameter.

* * * * *